United States Patent
Inoue et al.

(10) Patent No.: US 10,308,793 B2
(45) Date of Patent: Jun. 4, 2019

(54) NITRILE RUBBER COMPOSITION, LATEX COMPOSITION OF HIGHLY SATURATED NITRILE RUBBER, AND CROSS-LINKED RUBBER

(71) Applicant: ZEON CORPORATION, Tokyo (JP)

(72) Inventors: Sayaka Inoue, Tokyo (JP); Tomonori Nakashima, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 15/527,948

(22) PCT Filed: Nov. 20, 2015

(86) PCT No.: PCT/JP2015/082674
§ 371 (c)(1),
(2) Date: May 18, 2017

(87) PCT Pub. No.: WO2016/084734
PCT Pub. Date: Jun. 2, 2016

(65) Prior Publication Data
US 2017/0327672 A1 Nov. 16, 2017

(30) Foreign Application Priority Data
Nov. 27, 2014 (JP) .................................. 2014-239706

(51) Int. Cl.
| | | |
|---|---|---|
| *C08K 5/13* | (2006.01) | |
| *C08L 15/00* | (2006.01) | |
| *C08K 7/02* | (2006.01) | |
| *C08L 9/02* | (2006.01) | |
| *C08J 3/26* | (2006.01) | |
| *C08K 5/00* | (2006.01) | |
| *C08L 9/04* | (2006.01) | |
| *C08L 13/02* | (2006.01) | |

(52) U.S. Cl.
CPC ............... *C08L 15/005* (2013.01); *C08J 3/26* (2013.01); *C08K 5/0025* (2013.01); *C08K 5/13* (2013.01); *C08K 7/02* (2013.01); *C08L 9/02* (2013.01); *C08L 9/04* (2013.01); *C08L 13/02* (2013.01); *C08J 2415/00* (2013.01); *C08L 2312/02* (2013.01)

(58) Field of Classification Search
CPC .......... C08L 15/005; C08L 9/04; C08L 13/02; C08L 9/02; C08K 5/0025; C08K 7/02; C08K 5/13; C08J 3/26
See application file for complete search history.

(56) References Cited

U.S. PATENT DOCUMENTS

| | | |
|---|---|---|
| 5,683,819 A | 11/1997 | Mori et al. |
| 2002/0072557 A1 | 6/2002 | Arnoldi et al. |
| 2003/0176587 A1 | 9/2003 | Guerin et al. |
| 2004/0092634 A1 | 5/2004 | Arnoldi et al. |
| 2005/0143522 A1 | 6/2005 | Guerin et al. |
| 2007/0197688 A1 | 8/2007 | Tsukada et al. |
| 2011/0105692 A1 | 5/2011 | Yoshimura et al. |

FOREIGN PATENT DOCUMENTS

| | | |
|---|---|---|
| EP | 0 704 479 A1 | 4/1996 |
| JP | 2004-506769 A | 3/2004 |
| JP | 2005-516095 A | 6/2005 |
| JP | 2008-138048 A | 6/2008 |
| WO | 2005/092971 A1 | 10/2005 |
| WO | 2009/157533 A1 | 12/2009 |

OTHER PUBLICATIONS

Apr. 26, 2018 Canadian Office Action issued in Patent Application No. 2,968,351.
Dec. 28, 2015 Search Report issued in International Application No. PCT/JP2015/082674.
May 30, 2017 International Preliminary Report on Patentability issued in International Patent Application No. PCT/JP2015/082674.
Jun. 27, 2018 Extended European Search Report issued in European Patent Application No. 15862870.1.

*Primary Examiner* — Peter D. Mulcahy
(74) *Attorney, Agent, or Firm* — Oliff PLC

(57) ABSTRACT

A nitrile rubber composition comprising a highly saturated nitrile rubber (A) containing $\alpha,\beta$-ethylenically unsaturated nitrile monomer units in a ratio of 8 to 60 wt % and having an iodine value of 120 or less and an alkylated phenol compound (B), wherein a ratio of content of the alkylated phenol compound (B) with respect to a total of the highly saturated nitrile rubber (A) and the alkylated phenol compound (B) is 0.01 to 1 wt %, and a difference ($\eta 2-\eta 1$) between a plasticity number $\eta 2$ after storage at 70° C. for 7 days in a state of an aqueous dispersion by being dispersed in water and a plasticity number $\eta 1$ before the storage is 12 or less is provided.

12 Claims, No Drawings

NITRILE RUBBER COMPOSITION, LATEX COMPOSITION OF HIGHLY SATURATED NITRILE RUBBER, AND CROSS-LINKED RUBBER

TECHNICAL FIELD

The present invention relates to a nitrile rubber composition provided with excellent processability and able to give a cross-linked rubber excellent in tensile stress, a latex composition of a highly saturated nitrile rubber, and a cross-linked rubber obtained using the nitrile rubber composition and the latex composition of a highly saturated nitrile rubber.

BACKGROUND ART

In the past, nitrile rubber (acrylonitrile-butadiene copolymer rubber) has been used as a material for rubber parts for automobile such as hoses, belts, and tubes by making use of its oil resistance, mechanical properties, chemical resistance, etc. Further, highly saturated nitrile rubber obtained by saturation of carbon-carbon double bonds in the polymer main chain of nitrile rubber by hydrogenation etc. is further excellent in heat resistance and is being used for rubber parts such as seals, belts, hoses, and gaskets.

For example, Patent Document 1 discloses a nitrile group-containing highly saturated copolymer rubber comprising $\alpha,\beta$-ethylenically unsaturated nitrile monomer units (a) and conjugated diene monomer units (b) and having at least part of the conjugated diene monomer units (b) hydrogenated, where a ratio of content of $\alpha,\beta$-ethylenically unsaturated nitrile monomer units (a) is 37 to 45 wt %, a total of the $\alpha,\beta$-ethylenically unsaturated nitrile monomer units (a) and the conjugated diene monomer units (b) is 93 wt % or more, an iodine value is 9 or less, and a half value width of a peak of a loss tangent tan $\delta$ in a viscoelastic property in the case cross-linked is 5 to 20° C. in range.

However, the cross-linked rubber obtained by using the nitrile group-containing highly saturated copolymer rubber of the above Patent Document 1 is insufficient in tensile stress and therefore is not suitable for applications such as belt applications in which particular excellence in tensile stress is demanded.

RELATED ART

Patent Documents

Patent Document 1: WO2009/157533A

SUMMARY OF THE INVENTION

Problem to be Solved by the Invention

The present invention has as its object to provide a nitrile rubber composition provided with excellent processability and able to give a cross-linked rubber excellent in tensile stress, a latex composition of highly saturated nitrile rubber, and cross-linked rubber obtained using the nitrile rubber composition and the latex composition of a highly saturated nitrile rubber.

Means for Solving the Problem

The present inventors engaged in intensive research to solve the above problem and as a result discovered that the above object can be achieved by a rubber composition comprising a highly saturated nitrile rubber containing $\alpha,\beta$-ethylenically unsaturated nitrile monomer units in a ratio of 8 to 60 wt % and having an iodine value of 120 or less to which a predetermined amount of an alkylated phenol compound is mixed and having an amount of variation of plasticity number after storage at 70° C. for 7 days in a state of an aqueous dispersion by dispersing in water within a predetermined range and thereby completed the present invention.

That is, according to the present invention, there is provided a nitrile rubber composition comprising a highly saturated nitrile rubber (A) containing $\alpha,\beta$-ethylenically unsaturated nitrile monomer units in a ratio of 8 to 60 wt % and having an iodine value of 120 or less and an alkylated phenol compound (B), wherein a ratio of content of the alkylated phenol compound (B) with respect to a total of the highly saturated nitrile rubber (A) and the alkylated phenol compound (B) is 0.01 to 1 wt %, and a difference ($\eta 2 - \eta 1$) between a plasticity number $\eta 2$ after storage at 70° C. for 7 days in a state of an aqueous dispersion by being dispersed in water and a plasticity number $\eta 1$ before the storage is 12 or less.

In the nitrile rubber composition of the present invention, preferably the ratio of content of the alkylated phenol compound (B) with respect to a total of the highly saturated nitrile rubber (A) and the alkylated phenol compound (B) is 0.01 to 0.95 wt %

In the nitrile rubber composition of the present invention, preferably the alkylated phenol compound (B) is a compound represented by the following general formula (1) or a compound represented by the following general formula (2):

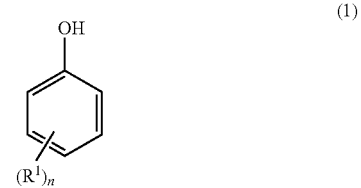

(1)

where, in the general formula (1), each of $R^1$ is respectively independently an alkyl group having 1 to 7 carbon atoms, alkoxy group having 1 to 5 carbon atoms, amino group, amino group substituted by an alkyl group having 1 to 4 carbon atoms, or nitrogen-containing heterocyclic group, and "n" is an integer of 1 to 5; in the above general formula (1), at least one of $R^1$ is an alkyl group having 1 to 7 carbon atoms:

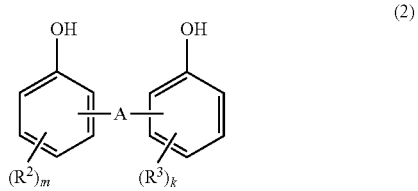

(2)

where, in the general formula (2), each of $R^2$ and $R^3$ is respectively independently an alkyl group having 1 to 7 carbon atoms, an alkoxy group having 1 to 5 carbon atoms, amino group, amino group substituted by an alkyl group having 1 to 4 carbon atoms, or nitrogen-containing heterocyclic group, A is a chemical single bond or alkylene group having 1 to 4 carbon atoms, and each of "m" and "k" is respectively independently an integer of 1 to 4; in the above general formula (2), at least one of $R^2$ is an alkyl group having 1 to 7 carbon atoms, while in the above general formula (2), at least one of $R^3$ is an alkyl group having 1 to 7 carbon atoms.

According to the present invention, there is provided a latex composition of a highly saturated nitrile rubber comprising a highly saturated nitrile rubber (A) containing α,β-ethylenically unsaturated nitrile monomer units in a ratio of 8 to 60 wt % and having an iodine value of 120 or less and an alkylated phenol compound (B), wherein a ratio of content of the alkylated phenol compound (B) with respect to a total of the highly saturated nitrile rubber (A) and the alkylated phenol compound (B) is 0.01 to 1 wt %, and a difference (η2−η1) between a plasticity number η2 of a coagulated product after storage at 70° C. for 7 days and a plasticity number η1 of a coagulated product before the storage is 12 or less.

In the latex composition of highly saturated nitrile rubber of the present invention, preferably the ratio of content of the alkylated phenol compound (B) with respect to a total of the highly saturated nitrile rubber (A) and the alkylated phenol compound (B) is 0.01 to 0.95 wt %.

In the nitrile rubber composition of the present invention, preferably the alkylated phenol compound (B) is the compound represented by the above general formula (1) or the compound represented by the above general formula (2).

Further, according to the present invention, there is provided a cross-linkable nitrile rubber composition obtained by mixing a cross-linking agent into the above nitrile rubber composition or a nitrile rubber composition obtained by coagulating the above latex composition of a highly saturated nitrile rubber. The cross-linkable nitrile rubber composition of the present invention preferably further comprises an organic staple fiber.

Furthermore, according to the present invention, there is provided a cross-linked rubber obtained by cross-linking the above cross-linkable nitrile rubber composition.

Effects of Invention

According to the present invention, it is possible to provide a nitrile rubber composition provided with excellent processability and able to give a cross-linked rubber excellent in tensile stress, a latex composition of a highly saturated nitrile rubber, and a cross-linked rubber obtained using the nitrile rubber composition and the latex composition of a highly saturated nitrile rubber.

DESCRIPTION OF EMBODIMENTS

Nitrile Rubber Composition

The nitrile rubber composition of the present invention is a composition comprising a highly saturated nitrile rubber (A) containing α,β-ethylenically unsaturated nitrile monomer units in a ratio of 8 to 60 wt % and having an iodine value of 120 or less, and an alkylated phenol compound (B), wherein a ratio of content of the alkylated phenol compound (B) to a total of the highly saturated nitrile rubber (A) and the alkylated phenol compound (B) is 0.01 to 1 wt %.

Further, the nitrile rubber composition of the present invention has a difference (η2−η1) between a plasticity number η2 after storage at 70° C. for 7 days in a state of an aqueous dispersion by being dispersed in water and a plasticity number η1 before the storage of 12 or less.

Furthermore, the "plasticity number η2" will be explained in detail later, but is a value measured in the state of the coagulated product obtained by dispersing a nitrile rubber composition of the present invention in water to obtain an aqueous dispersion, storing the aqueous dispersion at 70° C. for 7 days in this state, then making the aqueous dispersion coagulate.

Further, the "plasticity number η1" is a value measured before storing in the state of an aqueous dispersion under the above conditions. When the nitrile rubber composition before storing is obtained as an aqueous dispersion or solution, the "plasticity number η1" is a value measured in the state of the coagulated product which is obtained by coagulating these.

Highly Saturated Nitrile Rubber (A)

The highly saturated nitrile rubber (A) used in the present invention is rubber containing α,β-ethylenically unsaturated nitrile monomer units in a ratio of 8 to 60 wt % and having an iodine value of 120 or less.

The α,β-ethylenically unsaturated nitrile monomer forming the α,β-ethylenically unsaturated nitrile monomer units contained in the highly saturated nitrile rubber (A) used in the present invention is not particularly limited, but one having 3 to 18 carbon atoms is preferable, while one having 3 to 9 carbon atoms is particularly preferable. As specific examples, acrylonitrile, methacrylonitrile, α-chloroacrylonitrile, etc. may be mentioned. Among these as well, acrylonitrile is preferable. These α,β-ethylenically unsaturated nitrile monomers may be used as single types alone or as two types or more together.

In the highly saturated nitrile rubber (A), the content of the α,β-ethylenically unsaturated nitrile monomer units is 8 to 60 wt %, preferably 12 to 58 wt %, more preferably 16 to 50 wt %. If the content of the α,β-ethylenically unsaturated nitrile monomer units is too small, the obtained cross-linked rubber is liable to become inferior in oil resistance, while conversely if too great, the cold resistance may fall.

Further, the highly saturated nitrile rubber (A) used in the present invention, from the viewpoint of improvement of the mechanical properties by the rubber elasticity, preferably further contains diene monomer units and/or α-olefin monomer units.

As the diene monomer forming the diene monomer units, a conjugated diene having 4 or more carbon atoms such as 1,3-butadiene, isoprene, 2,3-dimethyl-1,3-butadiene, and 1,3-pentadiene; a nonconjugated diene having 5 to 12 carbon atoms such as 1,4-pentadiene and 1,4-hexadiene may be mentioned. Among these, a conjugated diene is preferable, while 1,3-butadiene is more preferable. The α-olefin monomer forming α-olefin monomer units is preferably one having 2 to 12 carbon atoms. Ethylene, propylene, 1-butene, 4-methyl-1-pentene, 1-hexene, 1-octene, etc. may be illustrated. These diene monomers and α-olefin monomers may be used as single types alone or as two types or more together.

In the highly saturated nitrile rubber (A), the content of the diene monomer units and/or α-olefin monomer units is preferably 40 to 90 wt %, more preferably 41 to 85 wt %, still more preferably 43 to 80 wt %. By making the content of the diene monomer units and/or α-olefin monomer units the above range, the obtained cross-linked rubber can be made excellent in elasticity while making heat resistance and chemical stability good.

Further, the nitrile group-containing copolymer rubber of the present invention may further contain α,β-ethylenically unsaturated monocarboxylic acid ester monomer units from the viewpoint of improvement of the cold resistance.

As the α,β-ethylenically unsaturated monocarboxylic acid ester monomer forming the α,β-ethylenically unsaturated monocarboxylic acid ester monomer units, for example, a (meth)acrylic acid ester (abbreviation for "methacrylic acid ester and acrylic acid ester", same below) having an alkyl group having 1 to 18 carbon atoms such as methyl acrylate, ethyl acrylate, n-butyl acrylate, isobutyl acrylate, n-dodecyl acrylate, methyl methacrylate, and ethyl methacrylate; a (meth)acrylic acid ester having an alkoxyalkyl group having 2 to 12 carbon atoms such as methoxymethyl acrylate, 2-methoxyethyl acrylate, 2-methoxyethyl methacrylate, 3-methoxypropyl acrylate, 4-ethoxybutyl methacrylate, 6-methoxyhexyl acrylate, 4-ethoxyheptyl methacrylate, and 8-methoxyoctyl acrylate; a (meth)acrylic acid ester having a cyanoalkyl group having 2 to 12 carbon atoms such as α-cyanoethyl acrylate, α-cyanoethyl methacrylate, and cyanobutyl methacrylate; a (meth)acrylic acid ester having a hydroxyalkyl group having 1 to 12 carbon atoms such as 2-hydroxyethyl acrylate, 2-hydroxypropyl acrylate, and 2-hydroxyethyl methacrylate; a (meth)acrylic acid ester having a fluoroalkyl group having 1 to 12 carbon atoms such as trifluoroethyl acrylate and tetrafluoropropyl methacrylate; etc. may be mentioned. These α,β-ethylenically unsaturated monocarboxylic acid ester monomers may be used as single types alone or as two types or more together.

In the nitrile group-containing copolymer rubber of the present invention, the content of the α,β-ethylenically unsaturated monocarboxylic acid ester monomer units is preferably 5 to 50 wt %, more preferably 10 to 45 wt %, still more preferably 15 to 40 wt %. By making the content of the α,β-ethylenically unsaturated monocarboxylic acid ester monomer units the above range, the obtained cross-linked rubber can be improved in cold resistance while making fatigue resistance and abrasion resistance good.

Alternatively, the nitrile group-containing copolymer rubber of the present invention may further contain carboxyl-group containing monomer units from the viewpoint of being able to further enhance the low heat buildup property.

The carboxyl-group containing monomer forming the carboxyl-group containing monomer units is not particularly limited so long as a monomer able to be copolymerized with the α,β-ethylenically unsaturated nitrile monomer and having at least one unsubstituted (free) carboxyl group which is not esterified etc.

As the carboxyl-group containing monomer, for example, an α,β-ethylenically unsaturated monocarboxylic acid monomer, α,β-ethylenically unsaturated polyvalent carboxylic acid monomer, α,β-ethylenically unsaturated dicarboxylic acid diester monomer, α,β-ethylenically unsaturated dicarboxylic acid monoester monomer, etc. may be mentioned. Further, the carboxyl-group containing monomer may also include monomers where the carboxyl groups of these monomers form carboxylates. Furthermore, anhydrides of α,β-ethylenically unsaturated polyvalent carboxylic acids cleave the acid anhydride group to form carboxyl groups after copolymerization, so can be used as the carboxyl-group containing monomer.

As the α,β-ethylenically unsaturated monocarboxylic acid monomer, acrylic acid, methacrylic acid, ethylacrylic acid, crotonic acid, cinnamic acid, etc. may be mentioned.

As the α,β-ethylenically unsaturated polyvalent carboxylic acid monomer, a butenedioic acid such as fumaric acid and maleic acid, itaconic acid, citraconic acid, mesaconic acid, glutaconic acid, allylmalonic acid, teraconic acid, etc. may be mentioned. Further, as an anhydride of an α,β-unsaturated polyvalent carboxylic acid, maleic anhydride, itaconic anhydride, citraconic anhydride, etc. may be mentioned.

As the α,β-ethylenically unsaturated dicarboxylic acid diester monomer, a maleic acid diester such as diethyl maleate; a fumaric acid diester such as dimethyl fumarate; a citraconic acid diester such as dimethyl citraconate; an itaconic acid diester such as dibutyl itaconate; etc. may be mentioned. As the α,β-ethylenically unsaturated dicarboxylic acid monoester monomer, a maleic acid monoalkyl ester such as monomethyl maleate, monoethyl maleate, monopropyl maleate, and mono n-butyl maleate; a maleic acid monocycloalkyl ester such as monocyclopentyl maleate, monocyclohexyl maleate, and monocycloheptyl maleate; a maleic acid monoalkylcycloalkyl ester such as monomethylcyclopentyl maleate and monoethylcyclohexyl maleate; a fumaric acid monoalkyl ester such as monomethyl fumarate, monoethyl fumarate, monopropyl fumarate, and mono n-butyl fumarate; a fumaric acid monocycloalkyl ester such as monocyclopentyl fumarate, monocyclohexyl fumarate, and monocycloheptyl fumarate; a fumaric acid monoalkylcycloalkyl ester such as monomethylcyclopentyl fumarate and monoethylcyclohexyl fumarate; a citraconic acid monoalkyl ester such as monomethyl citraconate, monoethyl citraconate, monopropyl citraconate, and mono n-butyl citraconate; a citraconic acid monocycloalkyl ester such as monocyclopentyl citraconate, monocyclohexyl citraconate, and monocycloheptyl citraconate; a citraconic acid monoalkylcycloalkyl ester such as monomethylcyclopentyl citraconate and monoethylcyclohexyl citraconate; an itaconic acid monoalkyl ester such as monomethyl itaconate, monoethyl itaconate, monopropyl itaconate, and mono n-butyl itaconate; an itaconic acid monocycloalkyl ester such as monocyclopentyl itaconate, monocyclohexyl itaconate, and monocycloheptyl itaconate; an itaconic acid monoalkylcycloalkyl ester such as monomethylcyclopentyl itaconate and monoethylcyclohexyl itaconate; etc. may be mentioned.

The carboxyl-group containing monomers may be used as single types alone or a plurality of types combined. Among these as well, since the effect of the present invention becomes much more remarkable, an α,β-ethylenically unsaturated dicarboxylic acid monoester monomer is preferable, a maleic acid monoalkyl ester is more preferable, and mono-n-butyl maleate is particularly preferable. Note that, as the number of carbon atoms of alkyl group in the above alkyl ester, 2 to 8 are preferable.

In the nitrile group-containing copolymer rubber of the present invention, the content of the carboxyl-group containing monomer units is preferably 1 to 30 wt %, more preferably 2 to 25 wt %, still more preferably 2 to 20 wt %. By making the content of the carboxyl-group containing monomer units the above range, it becomes possible to further improve the low heat buildup property of the obtained cross-linked rubber while making fatigue resistance good.

Further, the nitrile group-containing copolymer rubber of the present invention may contain, in addition to the units of the above monomers, units of other monomers copolymerizable with these monomers. As such other monomers, a nonconjugated diene monomer, aromatic vinyl monomer, cross-linkable monomer, copolymerizable antiaging agent, etc. may be mentioned.

As the nonconjugated diene monomer, one having 5 to 12 carbon atoms is preferable. For example, 1,4-pentadiene, 1,4-hexadiene, vinylnorbornene, dicyclopentadiene, etc. may be mentioned.

As the aromatic vinyl monomer, for example, styrene, α-methylstyrene, vinylpyridine, etc. may be mentioned.

As the cross-linkable monomer, for example, a polyfunctional ethylenically unsaturated monomer such as a divinyl compound such as divinylbenzene; a di(meth)acrylic acid ester such as ethylene di(meth)acrylate, diethyleneglycol di(meth)acrylate, and ethyleneglycol di(meth)acrylate; a trimethacrylic acid ester such as trimethylolpropane tri(meth)acrylate; etc. and also self-cross-linkable monomers such as N-methylol(meth)acrylamide and N,N'-dimethylol(meth)acrylamide, etc. may be mentioned.

As the copolymerizable antiaging agent, for example, n-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, N-phenyl-4-(4-vinylbenzyloxy)aniline, etc. may be mentioned.

These copolymerizable other monomers may be used as a plurality of types together. In the nitrile group-containing copolymer rubber of the present invention, the content of the units of the other monomers is preferably 50 wt % or less, more preferably 30 wt % or less, still more preferably 10 wt % or less.

The highly saturated nitrile rubber (A) used in the present invention preferably has a weight average molecular weight (Mw) of 10000 to 1000000. Note that, the weight average molecular weight (Mw) can be measured using GPC.

Further, the iodine value of the highly saturated nitrile rubber (A) used in the present invention is not particularly limited, but from the viewpoint of enhancing more the heat aging resistance and ozone resistance, is preferably 120 or less, more preferably 80 or less, still more preferably 60 or less, particularly preferably 30 or less.

The method of production of the highly saturated nitrile rubber (A) used in the present invention is not particularly limited, but is obtained by copolymerizing the above-mentioned monomers and, in accordance with need, hydrogenating the carbon-carbon double bonds in the obtained copolymer. The polymerization method is not particularly limited, but may be based on the known emulsion polymerization method or solution polymerization method, but from the viewpoint of industrial productivity, the emulsion polymerization method is preferable. At the time of emulsion polymerization, it is possible to use, in addition to an emulsifier, polymerization initiator and molecular weight adjuster, the usually used polymerization secondary material.

The emulsifier is not particularly limited, but, for example, a nonionic emulsifier such as a polyoxyethylene alkyl ether, polyoxyethylene alkyl phenol ether, polyoxyethylene alkyl ester, and polyoxyethylene sorbitan alkyl ester; an anionic emulsifier such as a salt of a fatty acid such as myristic acid, palmitic acid, oleic acid, and linoleic acid, an alkylbenzene sulfonic acid salt such as sodium dodecylbenzene sulfonate, a higher alcohol sulfuric acid ester salt, and an alkyl sulfosuccinic acid salt; a copolymerizable emulsifier such as a sulfo ester of an α,β-unsaturated carboxylic acid, a sulfate ester of an α,β-unsaturated carboxylic acid, and a sulfoalkylaryl ether; etc. may be mentioned. The amount of addition of the emulsifier is preferably 0.1 to 10 parts by weight with respect to 100 parts by weight of the monomer used for the polymerization, more preferably 0.5 to 5 parts by weight.

The polymerization initiator is not particularly limited so long as a radical initiator, but an inorganic peroxide such as potassium persulfate, sodium persulfate, ammonium persulfate, potassium peiphosphate, and hydrogen peroxide; an organic peroxide such as t-butyl peroxide, cumene hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butylperoxyisobutyrate; an azo compound such as azobisisobutyronitrile, azobis-2,4-dimethylvaleronitrile, azobiscyclohexanecarbonitrile, and methylazobis isobutyrate; etc. may be mentioned. These polymerization initiators can be used alone or as two or more types combined. As the polymerization initiator, an inorganic or organic peroxide is preferable. When using a peroxide as a polymerization initiator, a reducing agent such as sodium bisulfite and ferrous sulfate may be combined with for use as a redox-type polymerization initiator. The amount of use of the polymerization initiator is preferably 0.01 to 2 parts by weight with respect to 100 parts by weight of the monomer used for the polymerization.

The molecular weight adjuster is not particularly limited, but a mercaptan such as t-dodecyl mercaptan, n-dodecyl mercaptan, and octyl mercaptan; a halogenated hydrocarbon such as carbon tetrachloride, methylene chloride, and methylene bromide; α-methylstyrene dimer; a sulfur-containing compound such as tetraethylthiuram disulfide, dipentamethylene thiuram disulfide, and diisopropylxantogen disulfide; etc. may be mentioned. These may be used alone or as two types or more combined. Among these, a mercaptan is preferable, while t-dodecyl mercaptan is more preferable.

For the medium of emulsion polymerization, usually water is used. The amount of the water is preferably 80 to 500 parts by weight with respect to 100 parts by weight of the total monomers which are used in the polymerization, more preferably 80 to 300 parts by weight.

At the time of the emulsion polymerization, in accordance with need, it is possible to further use a polymerization secondary material such as a stabilizer, dispersant, pH adjuster, deoxidizer, and particle size adjuster. When using these, the types and amounts are not particularly limited.

Further, in the present invention, for the obtained copolymer, in accordance with need, the copolymer can be hydrogenated (hydrogenation reaction). The hydrogenation may be performed based on a known method. The oil layer hydrogenation method of coagulating the latex of the copolymer obtained by emulsion polymerization, then hydrogenating it in an oil layer, the aqueous layer hydrogenation method of hydrogenating the latex of the obtained copolymer as it is, etc. may be mentioned.

When performing the hydrogenation by the oil layer hydrogenation method, preferably the latex of the copolymer prepared by the above emulsion polymerization is dissolved in the organic solvent after coagulation by salting out or alcohol, separation by filtration, and drying. Next, a hydrogenation reaction (oil layer hydrogenation method) is performed and the obtained hydride poured into a large amount of water to make it coagulate, then the result separated by filtration and dried to thereby obtain the highly saturated nitrile rubber (A).

For coagulation of the latex by salting out, a known coagulant such as sodium chloride, calcium chloride, an aluminum sulfate can be used. Further, instead of coagulation by salting out, an alcohol such as methanol may be used for coagulation. The solvent for the oil layer hydrogenation method is not particularly limited so long as a liquid organic compound dissolving the copolymer obtained by emulsion polymerization, but benzene, chlorobenzene, toluene, xylene, hexane, cyclohexane, tetrahydrofuran, methylethylketone, ethyl acetate, cyclohexanone, acetone, etc. are preferably used.

As the catalyst of the oil layer hydrogenation method, any known selective hydrogenation catalyst can be used without particular limitation. A palladium-based catalyst and rhodium-based catalyst are preferable, while a palladium-based catalyst (palladium acetate, palladium chloride, palladium hydroxide, etc.) is more preferable. These may be used as two types or more combined, but in this case, it is preferable to make the palladium-based catalyst the main active ingredient. These catalysts are usually used carried on a carrier. As the carrier, silica, silica-alumina, alumina, diatomaceous earth, activated carbon, etc. may be illustrated. The amount of use of the catalyst is preferably 10 to 5000 ppm by weight with respect to the copolymer, more preferably 100 to 3000 ppm by weight.

Alternatively, when performing the hydrogenation by the aqueous layer hydrogenation method, preferably the hydrogenation reaction is performed while adding water as needed to the latex of the copolymer prepared by the above emulsion polymerization to dilute it. The aqueous layer hydrogenation method includes the aqueous layer direct hydrogenation method of supplying hydrogen to the reaction system in the presence of a hydrogenation catalyst to hydrogenate the latex and the aqueous layer indirect hydrogenation method of reducing the latex in the presence of an oxidizing agent, reducing agent, and activating agent to hydrogenate the latex. Among these, the aqueous layer direct hydrogenation method is preferable.

In the aqueous layer direct hydrogenation method, the concentration of the copolymer in the aqueous layer (concentration in latex state) is preferably 40 wt % or less to prevent coagulation. The hydrogenation catalyst is not particularly limited so long as a compound which is hard to break down in water. As specific examples, among palladium catalysts, a palladium salt of a carboxylic acid such as formic acid, propionic acid, lauric acid, succinic acid, oleic acid, and phthalic acid; chlorinated palladium such as palladium chloride, dichloro(cyclooctadiene) palladium, dichloro(norbornadiene) palladium, and ammonium hexachloropalladate (IV); an iodide such as palladium iodide; palladium sulfate-dihydrate etc. may be mentioned. Among these as well, a palladium salt of a carboxylic acid, dichloro(norbornadiene) palladium, and ammonium hexachloropalladate (IV) are particularly preferable. The amount of use of the hydrogenation catalyst may be suitably determined, but is preferably 5 to 6000 ppm by weight with respect to the copolymer obtained by polymerization, more preferably 10 to 4000 ppm by weight.

In the aqueous layer direct hydrogenation method, after the end of the hydrogenation reaction, the hydrogenation catalyst in the latex is removed. As the method, for example, the method of adding an adsorbent such as activated carbon and an ion exchange resin while stirring to make it adsorb the hydrogenation catalyst, then next filtering or separating by centrifugation the latex may be adopted. It is also possible to not remove the hydrogenation catalyst but to leave it in the latex.

Further, in the aqueous layer direct hydrogenation method, the thus obtained latex after the hydrogenation reaction is salted out to make it coagulate, separated by filtration, dried, etc. whereby the highly saturated nitrile rubber (A) can be obtained. In this case, the steps of filtration and drying following coagulation may be performed by known methods.

Alkylated Phenol Compound (B)

The alkylated phenol compound (B) used in the present invention is a phenol compound having at least one phenolic hydroxyl group and at least one alkyl group. The alkylated phenol compound (B) usually acts as an antiaging agent in the nitrile rubber composition of the present invention.

The alkylated phenol compound (B) used in the present invention need only be one having at least one phenolic hydroxyl group and at least one alkyl group, but one having one or two phenolic hydroxyl groups and at least one alkyl group at the o-position, m-position, or p-position of the phenolic hydroxyl group is preferable. Further, it may be one having a group other than an alkyl group at the o-position, position, or p-position of the phenolic hydroxyl group. As the alkylated phenol compound (B) used in the present invention, for example, a compound represented by the following general formula (1) or a compound represented by the following general formula (2) may be mentioned.

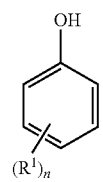

(1)

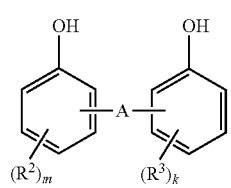

(2)

In the above general formula (1), each of $R^2$ is respectively independently an alkyl group having 1 to 7 carbon atoms, alkoxy group having 1 to 5 carbon atoms, amino group, amino group substituted by an alkyl group having 1 to 4 carbon atoms, or nitrogen-containing heterocyclic group, and "n" is an integer of 1 to 5. Further, in the above general formula (1), at least one of $R^2$ is an alkyl group having 1 to 7 carbon atoms.

In the above general formula (2), each of $R^2$ and $R^3$ is respectively independently an alkyl group having 1 to 7 carbon atoms, an alkoxy group having 1 to 5 carbon atoms, amino group, amino group substituted by an alkyl group having 1 to 4 carbon atoms, or nitrogen-containing heterocyclic group, A is a chemical single bond or alkylene group having 1 to 4 carbon atoms, and each of "m" and "k" is respectively independently an integer of 1 to 4. Further, in the above general formula (2), at least one of $R^2$ is an alkyl group having 1 to 7 carbon atoms, while in the above general formula (2), at least one of $R^3$ is an alkyl group having 1 to 7 carbon atoms.

From the viewpoint of being able to make the action and effect of the present invention much more remarkable, among the compounds represented by the above general formula (1) as well, one having an $R^2$ comprised of an alkyl group having 1 to 5 carbon atoms at least at an o-position or p-position of the phenolic hydroxyl group is preferable, while one having alkyl groups having 1 to 5 carbon atoms at all of the two o-positions and p-position of the phenolic hydroxyl group is particularly preferable.

Similarly, from the viewpoint of being able to make the action and effect of the present invention much more remarkable, among the compounds represented by the above general formula (2) as well, a compound represented by the following general formula (3) is preferable. Among the compounds represented by the following general formula (3)

as well, one having $R^2$ and $R^3$ comprised of alkyl groups having 1 to 5 carbon atoms at least at the o-positions or p-positions of the two phenolic hydroxyl groups provided at the two aromatic rings is preferable, while one having alkyl groups having 1 to 5 carbon atoms at all of the o-positions and p-positions of the two phenolic hydroxyl groups provided at the two aromatic rings is particularly preferable.

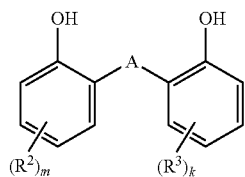

(3)

In the general formula (3), each of $R^2$, $R^3$, A, "m", and "k" is same as in the above general formula (2).

As specific examples of the alkylated phenol compound (B), 2-isopropyl-5-methylphenol, 3-methyl-4-isopropylphenol, butylhydroxyanisole, 2-(2H-benzotriazol-2-yl)-4,6-di-tert-butylphenol, 2,6-di-tert-butyl-p-cresol, 2,6-di-tert-butyl-α-dimethylamino-p-cresol, mixture of 2,6-di-tert-butylphenol, 2,4,6-tri-tert-butylphenol, and o-tert-butylphenol, mono(α-methylbenzyl)phenol, di(α-methylbenzyl)phenol, tri(α-methylbenzyl)phenol, mixture of alkyl- and aralkyl-substituted phenol, 2,2'-methylenebis (4-methyl-6-tert-butylphenol), 2,2'-methylene-bis-(4-methyl-6-cyclohexylphenol), 2,2'-methylenebis(4-ethyl-6-tert-butylphenol), alkylated bisphenol, 4,4'-methylene-bis-(2,6-di-tert-butylphenol), methylene-bridged polyvalent alkylphenol, butylated product of p-cresol and dicyclopentadiene, polybutylated bisphenol A, 4,4'-thiobis-(6-tert-butyl-3-methylphenol), 4,4'-butylidenebis-(3-methyl-6-tert-butylphenol), 2,4-bis[(octylthio)methyl]-o-cresol, hindered phenol, hindered bisphenol, etc. may be mentioned. Among these as well, from the viewpoint of being able to further enhance the action and effect of the present invention, 2,6-di-tert-butyl-4-methylphenol and 2,2'-methylenebis(4-methyl-6-tert-butylphenol) are more preferable.

In the nitrile rubber composition of the present invention, the ratio of content of the alkylated phenol compound (B) is 0.01 to 1 wt % with respect to the total of the highly saturated nitrile rubber (A) and the alkylated phenol compound (B), preferably 0.01 to 0.95 wt %, more preferably 0.02 to 0.95 wt %, still more preferably 0.02 to 0.7 wt %, even more preferably 0.02 to 0.5 wt %, particularly preferably 0.02 to 0.4 wt %. If the ratio of content of the alkylated phenol compound (B) is too small or too great, the effect of improvement of the processability as a nitrile rubber composition and the effect of improvement of the tensile stress when made into a cross-linked rubber end up being no longer obtainable. In particular, according to the present invention, by making the ratio of content of the alkylated phenol compound (B) 0.01 wt % or more, preferably 0.95 wt % or less, more preferably 0.7 wt % or less, still more preferably 0.5 wt % or less, particularly preferably 0.4 wt % or less, it is possible to make the difference (η2−η1) of plasticity numbers η1 and η2 suitably within a prescribed range of the present invention and, due to this, possible to suitably improve the processability as a nitrile rubber composition and tensile strength when made into cross-linked rubber.

Preparation of Nitrile Rubber Composition

The nitrile rubber composition of the present invention contains the above-mentioned highly saturated nitrile rubber (A) and alkylated phenol compound (B). The method of preparation is not limited. It may be any method enabling these to be simultaneously contained. For example, it may be obtained by the following method.

That is, first, the monomers for forming the highly saturated nitrile rubber (A) used in the present invention are copolymerized by the emulsion polymerization method to obtain a latex of the copolymer. Next, the alkylated phenol compound (B) is mixed with the obtained latex of the copolymer. In the state with the alkylated phenol compound (B) mixed, it is possible to hydrogenate (to perform a hydrogenation reaction of) the copolymer obtained by the emulsion polymerization then coagulate, dry, etc. the result to thereby obtain the nitrile rubber composition of the present invention containing the highly saturated nitrile rubber (A) and the alkylated phenol compound (B). Note that, the nitrile rubber composition of the present invention can usually be obtained in the state of a solid.

Note that, when performing the hydrogenation (hydrogenation reaction), it is possible to coagulate the latex of the copolymer containing the alkylated phenol compound (B), then perform the hydrogenation by an oil layer by using the oil layer hydrogenation method or alternatively it is possible to add water as needed to dilute the latex of the copolymer containing the alkylated phenol compound (B), then perform the hydrogenation by an aqueous layer by using the aqueous layer hydrogenation.

Further, when using the oil layer hydrogenation method to perform the hydrogenation, the nitrile rubber composition of the present invention is usually obtained in a state of the highly saturated nitrile rubber (A) and alkylated phenol compound (B) dissolved in an organic solvent. Further, such a solution of the nitrile rubber composition of the present invention may be coagulated by pouring in a large amount of water, filtered, and dried so as to obtain the nitrile rubber composition of the present invention in the solid state.

Further, when using the aqueous layer hydrogenation method to perform the hydrogenation, the nitrile rubber composition of the present invention is usually obtained in the state of the highly saturated nitrile rubber (A) and alkylated phenol compound (B) dispersed in water. Further, such an aqueous dispersion of the nitrile rubber composition of the present invention may be coagulated by salting out, filtered, and dried so as to obtain the nitrile rubber composition of the present invention in the solid state.

Note that, when preparing the nitrile rubber composition of the present invention by the above methods, if employing a method mixing the alkylated phenol compound (B) in the latex of the copolymer before hydrogenation, sometimes the amount of the alkylated phenol compound (B) fluctuates due to the later steps such as coagulation, but in the nitrile rubber composition of the present invention, it is sufficient to make the ratio of content of the alkylated phenol compound (B) after fluctuation after steps such as coagulation the above-mentioned range.

Further, the nitrile rubber composition of the present invention a difference (η2−η1) of 12 or less, preferably 10 or less, more preferably 8 or less, the difference (η2−η1) being a difference between the plasticity number η2 after storage at 70° C. for 7 days in a state of an aqueous dispersion by being dispersed in water and the plasticity number η1 before that storage. By making the difference (η2−η1) of the plasticity numbers η1 and η2 the above range, it is possible to make the nitrile rubber composition one which has excellent processability and which can give a cross-linked rubber excellent in tensile stress. In the present invention, when measuring the plasticity number $\eta2$, the nitrile rubber composition is made to disperse in water to obtain an aqueous dispersion, the aqueous dispersion is stored in that state at 70° C. for 7 days then is made to coagulate, then the measurement is performed for the obtained coagulated product, but the method of making the composition disperse in water is not particularly limited. Further, at this time, the solid content concentration in the aqueous dispersion is not particularly limited, but is preferably 5 to 47 wt %, more preferably 8 to 45 wt %.

For example, when preparing the nitrile rubber composition of the present invention, if using the aqueous layer hydrogenation method to perform the hydrogenation and obtaining the nitrile rubber composition of the present invention in the state of a dispersion in which it is dispersed in water, this can be used as it is. Alternatively, when preparing the nitrile rubber composition of the present invention, if using the oil layer hydrogenation method to perform the hydrogenation and obtaining the nitrile rubber composition of the present invention in the state of a solution in which it is dissolved in an organic solvent, it is possible to use the known phase inversion method to mix the solution and the emulsifier aqueous solution, strongly stir the mixture to cause emulsion and dispersion in the water, and furthermore remove the organic solvent to thereby obtain a dispersion comprised of the composition dispersed in water.

Furthermore, when obtaining the nitrile rubber composition of the present invention in a solid form, it is possible to dissolve the solid form nitrile rubber composition in an organic solvent able to dissolve the same, then use the known phase inversion method to mix the solution and emulsifier aqueous solution, strongly stir the mixture to cause emulsion and dispersion in the water, and furthermore remove the organic solvent to thereby obtain a dispersion comprised of the composition dispersed in water.

Note that, the plasticity numbers $\eta1$ and $\eta2$ of the nitrile rubber composition can be measured in accordance with "Plasticity Number by Rapid Plastometer" prescribed in JIS K6300-3. In this case, when obtaining the nitrile rubber composition of the present invention in the state of a dispersion where it is dispersed in water or when obtaining it in the state of a solution where it is dissolved in an organic solvent, this is made to coagulate and the obtained coagulated product is measured for plasticity number $\eta1$ in accordance with "Plasticity Number by Rapid Plastometer" prescribed in JIS K6300-3. Further, the plasticity number $\eta2$, as explained above, is obtained by dispersing the nitrile rubber composition in water to obtain an aqueous dispersion, storing it in that state at 70° C. for 7 days, then causing it to coagulate and performing the measurement for the obtained coagulated product by the "Plasticity Number by Rapid Plastometer" prescribed in JIS K6300-3.

In the present invention, the method of making the difference ($\eta2-\eta1$) of the plasticity number $\eta2$ and the plasticity number $\eta1$ the above range is not particularly limited, but, for example, when producing the highly saturated nitrile rubber (A) by the emulsion polymerization method, the method of adjusting the amount of use and type of the polymerization terminator used, the method of adjusting the amount of use of a metal-containing compound such as a chelating agent, the method of adjusting the pH of the obtained aqueous dispersion, etc. may be mentioned. Specifically, the method of jointly using, as the polymerization terminator, a quinone-based polymerization terminator and amine-based polymerization terminator in accordance with the composition of the highly saturated nitrile rubber (A) (for example, when making the highly saturated nitrile rubber (A) one not containing α,β-ethylenically unsaturated monocarboxylic acid ester monomer units), the method of making the amount of use of the polymerization terminator preferably 0.01 to 1 part by weight with respect to 100 parts by weight of the monomers used for the polymerization, the method of making the pH of the obtained aqueous dispersion preferably 6 to 13 in range, and, the method of, further, controlling the amount of use of a metal-containing compound such as a chelating agent preferably 0.001 to 0.1 parts by weight converted to metal with respect to 100 parts by weight of the monomers used for the polymerization, etc. may be mentioned.

Further, in the present invention, when obtaining a nitrile rubber composition in the state of an aqueous dispersion, it is possible to use it for various applications as is in the state of the aqueous dispersion without coagulation etc. (that is, as a latex composition of a highly saturated nitrile rubber).

Cross-Linkable Nitrile Rubber Composition

The cross-linkable rubber composition of the present invention is a composition of a highly saturated nitrile rubber obtained by adding a cross-linking agent to the above-mentioned nitrile copolymer rubber composition of the present invention. The cross-linking agent is not particularly limited. A sulfur-based cross-linking agent and organic peroxide-based cross-linking agent may be mentioned, but when the highly saturated nitrile rubber (A) has a carboxyl-group containing monomer units, it is possible to use a polyamine cross-linking agent.

As the sulfur-based cross-linking agent, a sulfur such as powdered sulfur, flower of sulfur, precipitated sulfur, colloidal sulfur, surface-treated sulfur, and insoluble sulfur; a sulfur-containing compound such as sulfur chloride, sulfur dichloride, morpholine disulfide, alkylphenol disulfide, dibenzothiazyl disulfide, N,N'-dithio-bis(hexahydro-2H-azepinone-2), phosphorus-containing polysulfide, and high molecular weight polysulfide; a sulfur donor compound such as tetramethylthiuram disulfide, selenium dimethyldithiocarbamate, and 2-(4'-morpholinodithio)benzothiazole; etc. may be mentioned. These may be used as single types alone or as a plurality of types together.

As the organic peroxide cross-linking agent, dicumyl peroxide, cumene hydroperoxide, t-butylcumyl peroxide, p-menthane hydroperoxide, di-t-butyl peroxide, 1,3-bis(t-butylperoxyisopropyl)benzene, 1,4-bis(t-butylperoxyisopropyl)benzene, 1,1-di-t-butylperoxy-3,3-trimethylcyclohexane, 4,4-bis-(t-butyl-peroxy)-n-butyl valerate, 2,5-dimethyl-2,5-di-t-butylperoxyhexane, 2,5-dimethyl-2,5-di-t-butylperoxyhexyne-3,1,1-di-t-butylperoxy-3,5,5-trimethylcyclohexane, p-chlorobenzoyl peroxide, t-butylperoxyisopropyl carbonate, t-butylperoxy benzoate, etc. may be mentioned. These may be used as single types alone or as a plurality of types combined.

The polyamine-based cross-linking agent is not particularly limited so long as a compound having two or more amino groups or a compound becoming a form having two or more amino groups at the time of cross-linking, but is preferably a compound comprised of an aliphatic hydrocarbon or aromatic hydrocarbon in which a plurality of hydrogen atoms are substituted by an amino group or hydrazide structure (structure represented by —CONHNH$_2$, where CO represents a carbonyl group) and a compound becoming that form at the time of cross-linking.

As specific examples of the polyamine-based cross-linking agent, an aliphatic polyvalent amine such as hexamethylenediamine, hexamethylenediamine carbamate, N,N-dicinnamylidene-1,6-hexanediamine, tetramethylenepentamine, and hexamethylenediamine cinnamaldehyde adduct; an aromatic polyvalent amine such as 4,4-methylenedianiline, phenylenediamine, 4,4-diaminodiphenylether, 3,4-diaminodiphenylether, 4,4-(m-phenylenediisopropylidene)dianiline, 4,4-(p-phenylenediisopropylidene)dianiline, 2,2-bis[4-(4-aminophenoxy)phenyl]propane, 4,4-diaminobenzanilide, 4,4-bis(4-aminophenoxy)biphenyl, m-xylylenediamine, p-xylylenediamine, and 1,3,5-benzenetriamine; and a polyvalent hydrazide such as isophthalic acid dihydrazide, terephthalic acid dihydrazide, phthalic acid dihydrazide, 2,6-naphthalene dicarboxylic acid dihydrazide, naphthalenic acid dihydrazide, oxalic acid dihydrazide, malonic acid dihydrazide, succinic acid dihydrazide, glutamic acid dihydrazide, adipic acid dihydrazide, pimelic acid dihydrazide, suberic acid dihydrazide, azelaic acid dihydrazide, sebacic acid dihydrazide, brassylic acid dihydrazide, dodecanedioic acid dihydrazide, acetone dicarboxylic acid dihydrazide, fumaric acid dihydrazide, maleic acid dihydrazide, itaconic acid dihydrazide, trimellitic acid dihydrazide, 1,3,5-benzene tricarboxylic acid dihydrazide, aconitic acid dihydrazide, and pyromellitic acid dihydrazide; may be mentioned. Among these as well, from the viewpoint that it is possible to make the effect of the present invention more remarkable, an aliphatic polyvalent amine and aromatic polyvalent amine are preferable, hexamethylenediamine carbamate and 2,2-bis[4-(4-aminophenoxy)phenyl]propane are more preferable, and hexamethylenediamine carbamate is particularly preferable.

In the cross-linkable nitrile rubber composition of the present invention, the content of the cross-linking agent is not particularly limited, but is preferably 0.1 to 10 parts by weight with respect to 100 parts by weight of the highly saturated nitrile rubber (A), more preferably 0.2 to 5 parts by weight.

Further, when using a polyamine-based cross-linking agent as a cross-linking agent, a basic cross-linking accelerator is preferably further included.

As specific examples of the basic cross-linking accelerator, a basic cross-linking accelerator having a ring-shaped amidine structure such as 1,8-diazabicyclo[5,4,0]undecene-7 (below, sometimes abbreviated as "DBU"), 1,5-diazacyclo[4,3,0]nonene-5 (below, sometimes abbreviated as "DBN"), 1-methylimidazole, 1-ethylimidazole, 1-phenylimidazole, 1-benzylimidazole, 1,2-dimethylimidazole, 1-ethyl-2-methylimidazole, 1-methoxyethylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole, 1-methyl-2-methoxyimidazole, 1-methyl-2-ethoxyimidazole, 1-methyl-4-methoxyimidazole, 1-methyl-2-methoxyimidazole, 1-ethoxymethyl-2-methylimidazole, 1-methyl-4-nitroimidazole, 1,2-dimethyl-5-nitroimidazole, 1,2-dimethyl-5-aminoimidazole, 1-methyl-4-(2-aminoethyl)imidazole, 1-methyl-benzoimidazole, 1-methyl-2-benzylbenzoimidazole, 1-methyl-5-nitrobenzoimidazole, 1-methylimidazoline, 1,2-dimethylimidazoline, 1,2,4-trimethylimidazoline, 1,4-dimethyl-2-ethylimidazoline, 1-methyl-phenylimidazoline, 1-methyl-2-benzylimidazoline, 1-methyl-2-ethoxyimidazoline, 1-methyl-2-heptylimidazoline, 1-methyl-2-undecylimidazoline, 1-methyl-2-heptadecylimidazoline, 1-methyl-2-ethoxymethylimidazoline, and 1-ethoxymethyl-2-methylimidazoline; a guanidine-based basic cross-linking accelerator such as tetramethylguanidine, tetraethylguanidine, diphenylguanidine, 1,3-di-o-tolylguanidine, and o-tolylbiguanide; an aldehydeamine-based basic cross-linking accelerator such as n-butylaldehyde aniline and acetoaldehyde ammonia; a dicycloalkylamine such as dicyclopentylamine, dicyclohexylamine, and dicycloheptylamine; a secondary amine-based basic cross-linking accelerator such as N-methylcyclopentylamine, N-butylcyclopentylamine, N-heptylcyclopentylamine, N-octylcyclopentylamine, N-ethylcyclohexylamine, N-butylcyclohexylamine, N-heptylcyclohexylamine, N-octylcyclooctylamine, N-hydroxymethylcyclopentylamine, N-hydroxybutylcyclohexylamine, N-methoxyethylcyclopentylamine, N-ethoxybutylcyclohexylamine, N-methoxycarbonylbutylcyclopentylamine, N-methoxycarbonylheptylcyclohexylamine, N-aminopropylcyclopentylamine, N-aminoheptylcyclohexylamine, di(2-chlorocyclopentyl)amine, and di(3-chlorocyclopentyl)amine; etc. may be mentioned. Among these, a guanidine-based basic cross-linking accelerator, secondary amine-based basic cross-linking accelerator, and basic cross-linking accelerator having a cyclic amidine structure are preferable, a basic cross-linking accelerator having a cyclic amidine structure is more preferable, 1,8-diazacyclo[5,4,0]undecene-7 and 1,5-diazacyclo[4,3,0]nonene-5 are still more preferable, and 1,8-diazacyclo[5,4,0]undecene-7 is particularly preferable. Note that, the above basic cross-linking accelerator having a cyclic amidine structure may also form a salt together with an organocarboxylic acid or alkyl phosphoric acid etc. Further, the above secondary amine-based basic cross-linking accelerator may be one in which alcohols such as an alkylene glycol and an alkyl alcohol having 5 to 20 carbon atoms is mixed. Furthermore, an inorganic acid and/or organic acid may also be included. Further, the secondary amine-based basic cross-linking accelerator and the inorganic acid and/or organic acid may form a salt and furthermore may form a complex with alkylene glycol.

In the case of mixing in the basic cross-linking accelerator, the amount in the cross-linkable nitrile rubber composition of the present invention is preferably 0.1 to 20 parts by weight with respect to 100 parts by weight of the highly saturated nitrile rubber (A), more preferably 0.2 to 15 parts by weight, still more preferably 0.5 to 10 parts by weight.

Further, the cross-linkable nitrile rubber composition of the present invention preferably further contains an organic staple fiber.

The organic staple fiber is not particularly limited so long as a fibrous organic material having an average fiber length of 0.1 to 12 mm. Note that, the average fiber length of the organic staple fiber can be found, for example, by taking a photograph using an optical microscope, measuring the lengths of 100 staple fibers randomly selected in the obtained photograph, and calculating the arithmetic average of the same. If the average fiber length is in the above range, it is possible to suitably raise the tensile stress of the obtained cross-linked rubber while effectively preventing a drop in the dispersability in the cross-linkable nitrile rubber composition due to entanglement of the staple fibers. The average fiber length of the organic staple fiber is preferably 0.5 to 10 mm, more preferably 0.5 to 6 mm.

Further, the average fiber diameter of the organic staple fiber is not particularly limited, but is preferably 0.5 to 100 µm, more preferably 1 to 50 µm, still more preferably 2 to 20 µm. Note that, the average fiber diameter of the organic staple fiber can be found, for example, by taking a photograph using an optical microscope, measuring the diameters of the thickest parts of 100 staple fibers randomly selected in the obtained photograph, and calculating the arithmetic average of the same. Further, the aspect ratio of the organic staple fiber ("average fiber length of organic staple fiber"/

"average fiber diameter of organic staple fiber") is not particularly limited, but is preferably 5 to 1000, more preferably 50 to 800.

As the organic staple fiber used in the present invention, natural fiber such as cotton and wood cellulose fiber; a fiber comprised of a synthetic resin such as a polyamide, polyester, polyvinyl alcohol, rayon, poly-p-phenylenebenzobisoxazole, polyethylene, polypropylene, polyarylate, polyimide, polyphenylene sulfide, polyether ether ketone, polylactic acid, polycaprolactone, polybutylene succinate, and a fluorine-based polymer; etc. may be mentioned. Among these as well, since the effect of addition becomes much more remarkable, staple fiber comprised of a synthetic resin is preferably used. Use of staple fiber comprised of polyamide is more preferable.

As the polyamide, an aliphatic polyamide such as polycapramide, poly-ω-aminoheptanoic acid, poly-ω-aminononoic acid, polyundecaneamide, polyethylenediamine adipamide, polytetramethylene adipamide, polyhexamethylene adipamide, polyhexamethylene sebacamide, polyhexamethylene dodecamide, polyoctamethylene adipamide, and polydecamethylene adipamide; an aromatic polyamide (aramid) such as poly-p-phenylene terephthalamide (product name "Kevlar", made by Toray Dupont), poly-m-phenylene isophthalamide (product name "Conex", made by Teijin Technoproducts), co-poly-p-phenylene-3,4'-oxydiphenylene terephthalamide (product name "Technora", made by Teijin Technoproducts), poly-m-xylylene adipamide, poly-m-xylylene pimeramide, poly-m-xylylene azelamide, poly-p-xylylene azelamide, and poly-p-xylylene decanamide; etc. may be mentioned. Among these as well, from the viewpoint of being able to further improve the obtained cross-linked rubber in tensile stress, an aromatic polyamide, that is, aramid, is preferable, poly-p-phenylene terephthalamide, poly-m-phenylene isophthalamide, and co-poly-p-phenylene-3,4'-oxydiphenylene terephthalamide are more preferable, and co-poly-p-phenylene-3,4'-oxydiphenylene terephthalamide is particularly preferable.

That is, as the staple fiber comprised of a polyamide, an aramid staple fiber is preferable, a poly-p-phenylene terephthalamide staple fiber, poly-m-phenylene isophthalamide staple fiber, and co-poly-p-phenylene-3,4'-oxydiphenylene terephthalamide staple fiber are more preferable, and a co-poly-p-phenylene-3,4'-oxydiphenylene terephthalamide staple fiber is particularly preferable.

Note that, the organic staple fiber may be chopped fiber (cut fiber) in form or may be a pulp-form having fibrils. Further, it may be treated in various ways by an epoxy-based adhesive agent, isocyanate-based adhesive agent, resorcine-formaldehyde resin/latex, etc.

In the cross-linkable nitrile rubber composition of the present invention, the amount of the organic staple fiber is preferably 0.5 to 80 parts by weight with respect to 100 parts by weight of the highly saturated nitrile rubber (A), more preferably 1 to 50 parts by weight, still more preferably 1 to 30 parts by weight. By making the amount of the organic staple fiber the above range, it is possible to suitably improve the tensile stress of the obtained cross-linked rubber while making the processability at the time of kneading excellent.

Further, the cross-linkable nitrile rubber composition of the present invention may have blended into it other compounding agents which are usually used in the field of rubber processing. As such compounding agents, for example, a reinforcing agent, filler, photostabilizer, scorch preventer, plasticizer, processing aid, slip agent, tackifier, lubricant, flame retardant, acid acceptor, antifungal agent, antistatic agent, coloring agent, silane coupling agent, cross-linking aid, co-cross-linking agent, cross-linking accelerator, cross-linking retardant, foam agent, etc. may be mentioned. As the amounts of these compounding agents, amounts according to the purposes of inclusion may be suitably employed.

The plasticizer is not particularly limited, but a trimellitic acid-based plasticizer or ether ester-based plasticizer etc. can be used. As specific examples, tri-2-ethylhexyl trimellitate, trimellitic acid isononyl ester, bis[2-(2-butoxyethoxy)ethyl] adipate, diheptanoate, di-2-ethylhexanoate, didecanoate, etc. may be mentioned. These may be used as single types alone or as two types or more combined.

Furthermore, the cross-linkable nitrile rubber composition of the present invention may contain rubber other than the above-mentioned highly saturated nitrile rubber (A) to the extent not impairing the advantageous effects of the present invention.

As such rubber, acrylic rubber, ethylene-acrylic acid copolymer rubber, styrene-butadiene copolymer rubber, polybutadiene rubber, ethylene-propylene copolymer rubber, ethylene-propylene-diene ternary copolymer rubber, epichlorohydrin rubber, fluororubber, urethane rubber, chloroprene rubber, silicone rubber, natural rubber, polyisoprene rubber, etc. may be mentioned.

When mixing in rubber other than the highly saturated nitrile rubber (A), the amount in the cross-linkable nitrile rubber composition is preferably 30 parts by weight or less with respect to 100 parts by weight of the highly saturated nitrile rubber (A), more preferably 20 parts by weight or less, still more preferably 10 parts by weight or less.

Further, the cross-linkable nitrile rubber composition of the present invention is prepared by mixing the above ingredients in a preferably nonaqueous system. The method of preparing the cross-linkable nitrile rubber composition of the present invention is not particularly limited, but the composition usually can be prepared by mixing the ingredients other than the cross-linking agent and ingredients which are unstable against heat such as the co-cross-linking agent etc. by a mixing machine such as a Bambury mixer, inter mixer, or kneader for primary kneading, then transferring the mixture to open rolls etc. to add the cross-linking agent and ingredients which are unstable against heat such as the co-cross-linking agent etc. for secondary kneading. Note that, the primary kneading is usually performed at 10 to 200° C., preferably 30 to 180° C. in temperature, for 1 minute to 1 hour, preferably 1 minute to 30 minutes, while the secondary kneading is usually performed at 10 to 90° C., preferably 20 to 60° C. in temperature, for 1 minute to 1 hour, preferably 1 minute to 30 minutes.

The thus obtained cross-linkable nitrile rubber composition of the present invention has a compound Mooney viscosity ($ML_{1+4}$, 100° C.) of preferably 10 to 200, more preferably 40 to 140, still more preferably 50 to 100, and is excellent in processability.

Cross-Linked Rubber

The cross-linked rubber of the present invention is one obtained by cross-linking the above-mentioned cross-linkable nitrile rubber composition of the present invention.

The cross-linked rubber of the present invention can be produced by using the cross-linkable nitrile rubber composition of the present invention, using a forming machine which corresponds to the desired shape, for example, an extruder, injection molding machine, press, rolls, etc. for forming, heating to cause a cross-linking reaction and thereby fixing the shape as a cross-linked product. In this case, it is possible to form the rubber, then cross-link it and possible to cross-link it simultaneously with forming. The forming temperature is usually 10 to 200° C., preferably 25 to 120° C. The cross-linking temperature is usually 100 to 200° C., preferably 130 to 190° C., while the cross-linking time is usually 1 minute to 24 hours, preferably 2 minutes to 1 hour.

Further, depending on the shape, size, etc. of the cross-linked product, sometimes, even if the surface is cross-linked, the inside part is not sufficiently cross-linked, so it is possible to further heat the rubber for secondary cross-linking.

As the heating method, a general method which is used for cross-linking rubber such as press heating, steam heating, oven heating, and hot air heating may be suitably selected.

The thus obtained cross-linked rubber of the present invention is one obtained by cross-linking the above-mentioned cross-linkable nitrile rubber composition of the present invention and is excellent in tensile stress.

Therefore, the cross-linked rubber of the present invention, taking advantage of such a characteristic, can be used for various seal members such as O-rings, packings, diaphragms, oil seals, shaft seals, bearing seals, well head seals, air compressor seals, seals for sealing in Freon or fluorohydrocarbons or carbon dioxide which is used for compressors for cooling devices for air-conditioners or refrigerating machines of air-conditioning systems, seals for sealing in supercritical carbon dioxide or subcritical carbon dioxide which is used for the washing media in precision washing, seals for roller devices (roller bearings, automotive hub units, automotive water pumps, linear guide devices and ball screws, etc.), valves and valve seats, BOP (blow out preventers), and bladders; various types of gaskets such as intake manifold gaskets which are attached at connecting parts of intake manifolds and cylinder heads, cylinder head gaskets which are attached at connecting parts of cylinder blocks and cylinder heads, rocker cover gaskets which are attached at connecting parts of rocker covers and cylinder heads, oil pan gaskets which are attached at connecting parts of oil pans and cylinder blocks or transmission cases, fuel cell separator use gaskets which are attached between pairs of housings straddling unit cells provided with positive electrodes, electrolyte plates, and negative electrodes, and top cover use gaskets for hard disk drives; various types of rolls such as printing use rolls, ironmaking use rolls, papermaking use rolls, industrial use rolls, and office equipment use rolls; various types of belts such as flat belts (film core flat belts, cord flat belts, laminated flat belts, single type flat belts, etc.), V-belts (wrapped V-belts, low edge V-belts, etc.), V-ribbed belts (single V-ribbed belts, double V-ribbed belts, wrapped V-ribbed belt, rubber-backed V-ribbed belts, top cog V-ribbed belts, etc.), CVT use belts, timing belts, toothed belts, and conveyor belts; various types of hoses such as fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, and flow lines; and various types of boots such as CVJ boots, propeller shaft boots, constant velocity joint boots, and rack and pinion boots; attenuating member rubber parts such as cushion materials, dynamic dampers, rubber couplings, air springs, shock absorbers, and clutch facing materials; dust covers, automotive interior members, friction materials, tires, covered cables, shoe soles, electromagnetic wave shields, binders for flexible printed circuits boards or other binders, fuel cell separators and also other broad applications in the electronics field. Among these as well, since the cross-linked rubber of the present invention is particularly excellent in tensile strength, it is suitable as a belt.

EXAMPLES

Below, the present invention will be explained based on more detailed examples, but the present invention is not limited to these examples. Note that, below, "parts" are based on weight unless particularly indicated otherwise. Further, the tests and evaluations were performed as follows.

Iodine Value

The iodine value of the highly saturated nitrile rubber was measured in accordance with JIS K6235.

Plasticity Number

The plasticity numbers $\eta1$ and $\eta2$ of the nitrile rubber composition were measured using a plasticity number $\eta1$ measurement-use sample and plasticity number $\eta2$ measurement-use sample by a "RAPID PLASTIMETER P14VT (made by Wallace)" as a measuring device in accordance with JIS K6300-3. Further, the difference ($\eta2-\eta1$) was calculated using the plasticity numbers $\eta1$ and $\eta2$ obtained as a result of measurement.

Capillary Extrudability

The nitrile rubber composition was evaluated for fluidity using a capillary rheometer for rubber (product name "Rubber Capillary Rheometer", made by Goettfert). Specifically, the piston temperature was set to 100° C., the chamber temperature was set to 100° C., the nitrile rubber composition was charged and preheated for 3 minutes, then the piston was used to extrude the composition by 200 bar of pressure and the amount of extrusion ($mm^3$) after 60 seconds was measured. The greater the amount of extrusion at this time, the better the processability (fluidity) can be judged.

Content of Alkylated Phenol Compound in Nitrile Rubber Composition

In accordance with JIS K6229, the nitrile rubber composition was extracted over methanol. Further, the obtained extracted product was dissolved in chloroform, then, referring to JIS K0114 and JIS K6231, gas chromatography was used to measure the peak area and the calibration curve method was used to measure the content of the alkylated phenol compound in the nitrile rubber composition (that is, ratio of content of alkylated phenol compound with respect to a total of highly saturated nitrile rubber and alkylated phenol compound). As a gas chromatograph, a GC-2010 (made by Shimadzu Corporation) with hydrogen flame ionization type detector and a Zebron ZB 130 m×0.25 mm×0.3 μm column were used. Note that, for Production Example 9, instead of the content of the alkylated phenol compound, the content of the N-phenyl-N'-(1,3-dimethylbutyl)-p-phenylenediamine was measured.

Original State Physical Properties (20% Tensile Stress)

The cross-linkable nitrile rubber composition was placed in a mold of a vertical 15 cm, horizontal 15 cm, and depth 0.2 cm and press-formed at 170° C. for 20 minutes while pressing it by a pressure of 10 MPa to obtain a sheet-shaped cross-linked rubber. The obtained sheet-shaped cross-linked rubber was punched by a No. 3 dumbbell shape. Further, the obtained test piece was used to measure the 20% tensile strength of the cross-linked rubber based on JIS K 6251.

Production Example 1 (Production of Nitrile Rubber Composition (a-1))

In a reactor, to 200 parts of ion exchanged water, 0.2 part of sodium carbonate was dissolved. To this, 2.25 parts of a fatty acid potassium soap (potassium salt of fatty acid) was added to prepare a soap aqueous solution. Further, to this soap aqueous solution, 38 parts of acrylonitrile and 0.45 part of t-dodecylmercaptan (molecular weight adjuster) were successively charged. The gas at the inside was replaced with nitrogen three times, then 62 parts of 1,3-butadiene was charged. Next, the inside of the reactor was held at 5° C. and 0.1 part of cumen hydroperoxide (polymerization initiator) and suitable quantities of a reducing agent and a chelating agent were charged and the polymerization reaction started. Further, when the polymer conversion rate reached 80%, 0.05 part of a concentration 10% hydroquinone (polymerization terminator) aqueous solution and 0.05 part of N-isopropylhydroxylamine (polymerization terminator) were added to stop the polymerization reaction then 0.4 part of an alkylated phenol compound (B) comprised of 2,6-di-tert-butyl-4-methylphenol was added and a water temperature 60° C. rotary evaporator was used to remove the residual monomers and obtain a latex of a nitrile rubber (solid content concentration about 25 wt %). Note that, the obtained latex had a pH of 9.6.

Next, to the above obtained latex, an aqueous solution of aluminum sulfate was added in an amount corresponding to 3 wt % of the nitrile rubber content in the above obtained latex and the result was stirred so as to coagulate the latex, then this was washed with water while filtering it, then dried in vacuo at 60° C. for 12 hours to obtain a nitrile rubber. Further, the obtained nitrile rubber was dissolved in acetone to a concentration of 12 wt %. This was placed in an autoclave. A palladium-silica catalyst was added to the nitrile rubber in an amount of 600 ppm by weight and a hydrogenation reaction was performed under a hydrogen pressure of 3.0 MPa to thereby obtain a solution of a nitrile rubber composition (a-1) containing a highly saturated nitrile rubber (A-1) and an alkylated phenol compound (B) comprised of 2,6-di-tert-butyl-4-methylphenol.

Further, part of the solution of the obtained nitrile rubber composition (a-1) was taken out, poured into a large amount of water to make it coagulate, filtered, and dried to thereby obtain a solid nitrile rubber composition (a-1). The composition of the highly saturated nitrile rubber (A-1) contained in the obtained nitrile rubber composition (a-1) was 36 wt % of acrylonitrile units and 74 wt % of butadiene units (including saturated part), the iodine value was 8, and the polymer Mooney viscosity ($ML_{1+4}$, 100° C.) was 63. Part of the obtained solid nitrile rubber composition (a-1) was made the "plasticity number h1 measurement-use sample".

Further, separate from the above, the remaining part of the solution of the obtained nitrile rubber composition (a-1) was mixed with water containing an emulsifier comprised of potassium oleate and steam stripped to remove the acetone and thereby obtain an aqueous dispersion of a nitrile rubber composition (a-1). Further, the aqueous dispersion of the obtained nitrile rubber composition (a-1) was stored at 70° C. for 7 days. Further, to the aqueous dispersion after storage at 70° C. for 7 days, two volumes of methanol were added to coagulate the same, then the result was filtered and the solids (crumbs) were taken out. These were vacuum dried at 60° C. for 12 hours to thereby obtain a nitrile rubber composition (a-1) after storage at 70° C. for 7 days. Further, part of the obtained nitrile rubber composition (a-1) after storage at 70° C. for 7 days was used to evaluate the capillary extrudability in accordance with the above method, and a separately part of the obtained nitrile rubber composition (a-1) after storage at 70° C. for 7 days was sampled to be made the "plasticity number η2 measurement-use sample". Further, the above obtained "plasticity number η1 measurement-use sample" and "plasticity number η2 measurement-use sample" were used to measure the difference (η2−η1) between the plasticity number η2 and the plasticity number η1 in accordance with the above method.

Production Example 2 (Production of Nitrile Rubber Composition (a-2))

In a reactor, to 200 parts of ion exchanged water, 0.2 part of sodium carbonate was dissolved. To this, 2.25 parts of a fatty acid potassium soap (potassium salt of fatty acid) was added to prepare a soap aqueous solution. Further, to this soap aqueous solution, 13 parts of acrylonitrile, 29 parts of n-butyl acrylate, and 0.45 part of t-dodecylmercaptan (molecular weight adjuster) were charged. The gas at the inside was replaced with nitrogen three times, then 21 parts of 1,3-butadiene was charged. Next, the inside of the reactor was held at 5° C. and 0.1 part of cumen hydroperoxide (polymerization initiator) and suitable quantities of a reducing agent and a chelating agent were charged and the polymerization reaction started. Further, when the polymer conversion rate reached 60%, 12 parts of acrylonitrile, and 25 parts of 1,3-butadiene were added. Further, when the polymer conversion rate reached 85%, 0.05 part of a concentration 10% hydroquinone (polymerization terminator) aqueous solution and 0.05 part of N-isopropylhydroxylamine (polymerization terminator) were added to stop the polymerization reaction then 0.45 part of an alkylated phenol compound (B) comprised of 2,6-di-tert-butyl-4-methylphenol was added and a water temperature 60° C. rotary evaporator was used to remove the residual monomers and obtain a latex of a nitrile rubber (solid content concentration about 25 wt %). Note that, the obtained latex had a pH of 10.1.

Next, to the above obtained latex, an aqueous solution of aluminum sulfate was added in an amount corresponding to 3 wt % of the nitrile rubber content in the above obtained latex and the result was stirred so as to coagulate the latex, then this was washed with water while filtering it, then dried in vacuo at 60° C. for 12 hours to obtain a nitrile rubber. Further, the obtained nitrile rubber was dissolved in acetone to a concentration of 12 wt %. This was placed in an autoclave. A palladium-silica catalyst was added to the nitrile rubber in an amount of 500 ppm by weight and a hydrogenation reaction was performed under a hydrogen pressure of 3.0 MPa to thereby obtain a solution of a nitrile rubber composition (a-2) containing a highly saturated nitrile rubber (A-2) and an alkylated phenol compound (B) comprised of 2,6-di-tert-butyl-4-methylphenol.

Further, part of the solution of the obtained nitrile rubber composition (a-2) was taken out, poured into a large amount of water to make it coagulate, filtered, and dried to thereby obtain a solid nitrile rubber composition (a-2). The composition of the highly saturated nitrile rubber (A-2) contained in the obtained nitrile rubber composition (a-2) was 26.2 wt % of acrylonitrile units, 29.3 wt % of n-butyl acrylate units, and 44.5 wt % of butadiene units (including saturated part), the iodine value was 15, and the polymer Mooney viscosity ($ML_{1+4}$, 100° C.) was 68. Part of the obtained solid nitrile rubber composition (a-2) was made the "plasticity number η1 measurement-use sample".

Further, in the same way as Production Example 1, separate from the above, the remaining part of the solution of the obtained nitrile rubber composition (a-2) was used to obtain the aqueous dispersion of the nitrile rubber composition (a-2) and this was stored at 70° C. for 7 days. Further, to the aqueous dispersion after storage at 70° C. for 7 days, two volumes of methanol were added to coagulate the same, then the result was filtered and the solids (crumbs) were taken out. These were vacuum dried at 60° C. for 12 hours to thereby obtain a nitrile rubber composition (a-2) after storage at 70° C. for 7 days. Further, part of the obtained nitrile rubber composition (a-2) after storage at 70° C. for 7 days was used to evaluate the capillary extrudability in accordance with the above method, and a separately part of the obtained nitrile rubber composition (a-2) after storage at 70° C. for 7 days was sampled to be made the "plasticity number η2 measurement-use sample". Further, the above obtained "plasticity number η1 measurement-use sample" and "plasticity number η2 measurement-use sample" were used to measure the difference (η2–η1) between the plasticity number η2 and the plasticity number η1 in accordance with the above method.

Production Example 3 (Production of Nitrile Rubber Composition (a-3))

To a reactor, 180 parts of ion exchanged water, 25 parts of a concentration 10 wt % sodium dodecylbenzene sulfonate aqueous solution, 37 parts of acrylonitrile, 6 parts of mono-n-butyl maleate, and 0.5 part of t-dodecylmercaptan (molecular weight adjuster) were successively charged. The gas at the inside was replaced with nitrogen three times, then 57 parts of 1,3-butadiene was charged. The reactor was held at 5° C., 0.1 part of cumen hydroperoxide (polymerization initiator) was charged, and the mixture was stirred while continuing a polymerization reaction for 16 hours. Next, 0.1 part of a concentration 10 wt % hydroquinone aqueous solution (polymerization terminator) was added to stop the polymerization reaction, then 0.25 part of an alkylated phenol compound (B) comprised of 2,2'-methylenebis(4-methyl-6-tert-butylphenol) was added. Next, a water temperature 60° C. rotary evaporator was used to remove the residual monomers and obtain a latex of a nitrile rubber (solid content concentration about 30 wt %). Note that, the obtained latex had a pH of 3.0.

Next, to an autoclave, the latex and a palladium catalyst (solution of 1 wt % palladium acetate acetone solution and equal weight of ion exchanged water mixed together) were charged so that platinum content became 1,000 ppm by weight with respect to the dry weight of the rubber contained in the latex. These were reacted under a hydrogen pressure of 3 MPa and temperature of 50° C. for 6 hours for hydrogenation to obtain an aqueous dispersion of a nitrile rubber composition (a-3) containing a highly saturated nitrile rubber (A-3) and an alkylated phenol compound (B) comprised of 2,2'-methylenebis(4-methyl-6-tert-butylphenol).

Further, part of the aqueous solution of the obtained nitrile rubber composition (a-3) was taken out, two volumes of methanol were added to coagulate the same, then the result was filtered and the solids (crumbs) were taken out. These were vacuum dried at 60° C. for 12 hours to thereby obtain a nitrile rubber composition (a-3). The composition of the highly saturated nitrile rubber (A-3) contained in the obtained nitrile rubber composition (a-3) was 35.6 wt % of acrylonitrile units, 59.0 wt % of butadiene units (including saturated part), and 5.4 wt % of mono-n-butyl maleate units, the iodine value was 8, the content of carboxyl groups was $3.1 \times 10^{-2}$ ephr, and the polymer Mooney viscosity ($ML_{1+4}$, 100° C.) was 49. Part of the obtained solid nitrile rubber composition (a-3) was made the "plasticity number η1 measurement-use sample".

Further, separate from the above, the remaining part of the aqueous solution of the obtained nitrile rubber composition (a-3) was stored at 70° C. for 7 days. Further, to the aqueous dispersion after storage at 70° C. for 7 days, two volumes of methanol were added to coagulate the same, then the result was filtered and the solids (crumbs) were taken out. These were vacuum dried at 60° C. for 12 hours to thereby obtain a nitrile rubber composition (a-3) after storage at 70° C. for 7 days. Further, part of the obtained nitrile rubber composition (a-3) after storage at 70° C. for 7 days was used to evaluate the capillary extrudability in accordance with the above method, and a separately part of the obtained nitrile rubber composition (a-3) after storage at 70° C. for 7 days was sampled to be made the "plasticity number η2 measurement-use sample". Further, the above obtained "plasticity number η1 measurement-use sample" and "plasticity number η2 measurement-use sample" were used to measure the difference (η2–η1) between the plasticity number η2 and the plasticity number η1 in accordance with the above method.

Production Example 4 (Production of Nitrile Rubber Composition (a-4))

Except for adding, instead of 0.4 part of 2,6-di-tert-butyl-4-methylphenol, 0.13 part of 2,2'-methylenebis(4-methyl-6-tert-butylphenol) as the alkylated phenol compound (B) after stopping the polymerization reaction, the same procedure was performed as in Production Example 1 to obtain a solution of a nitrile rubber composition (a-4) containing the highly saturated nitrile rubber (A-1) and alkylated phenol compound (B) comprised of 2,2'-methylenebis(4-methyl-6-tert-butylphenol) and the same procedure was performed to store it at 70° C. for 7 days and measure it.

Production Example 5 (Production of Nitrile Rubber Composition (a-5))

Except for adding, instead of 0.25 part of 2,2'-methylenebis(4-methyl-6-tert-butylphenol), 0.4 part of 2,6-di-tert-butyl-4-methylphenol as the alkylated phenol compound (B) after stopping the polymerization reaction, the same procedure was performed as in Production Example 3 to obtain an aqueous dispersion of a nitrile rubber composition (a-5) containing the highly saturated nitrile rubber (A-3) and alkylated phenol compound (B) comprised of 2,6-di-tert-butyl-4-methylphenol and the same procedure was performed to store it at 70° C. for 7 days and measure it.

Production Example 6 (Production of Nitrile Rubber Composition (a-6))

Except for not adding 0.25 part of the alkylated phenol compound (B) comprised of 2,2'-methylenebis(4-methyl-6-tert-butylphenol) after stopping the polymerization reaction, the same procedure was performed as in Production Example 3 to obtain an aqueous dispersion of a nitrile rubber composition (a-6) containing the highly saturated nitrile rubber (A-3) and the same procedure was performed to store it at 70° C. for 7 days and measure it.

Production Example 7 (Production of Nitrile Rubber Composition (a-7))

Except for not adding 0.4 part of the alkylated phenol compound (B) comprised of 2,6-di-tert-butyl-4-methylphenol after stopping the polymerization reaction, the same procedure was performed as in Production Example 1 to obtain a solution of a nitrile rubber composition (a-7)

containing the highly saturated nitrile rubber (A-1) and the same procedure was performed to store it at 70° C. for 7 days and measure it.

Production Example 8 (Production of Nitrile Rubber Composition (a-8))

Except for not adding 0.45 part of the alkylated phenol compound (B) comprised of 2,6-di-tert-butyl-4-methylphenol after stopping the polymerization reaction, the same procedure was performed as in Production Example 2 to obtain a solution of a nitrile rubber composition (a-8) containing the highly saturated nitrile rubber (A-2) and the same procedure was performed to store it at 70° C. for 7 days and measure it.

Production Example 9 (Production of Nitrile Rubber Composition (a-9))

In a reactor, to 200 parts of ion exchanged water, 0.2 part of sodium carbonate was dissolved. To this, 2.25 parts of a fatty acid potassium soap (potassium salt of fatty acid) was added to prepare a soap aqueous solution. Further, to this soap aqueous solution, 38 parts of acrylonitrile and 0.45 part of t-dodecylmercaptan (molecular weight adjuster) were successively charged. The gas at the inside was replaced with nitrogen three times, then 62 parts of 1,3-butadiene was charged. Next, the inside of the reactor was held at 5° C. and 0.1 part of cumen hydroperoxide (polymerization initiator) and suitable quantities of a reducing agent and a chelating agent were charged and the polymerization reaction started. Further, when the polymer conversion rate reached 80%, 0.05 part of a concentration 10% hydroquinone (polymerization terminator) aqueous solution and 0.05 part of N-isopropylhydroxylamine (polymerization terminator) were added to stop the polymerization reaction then 0.45 part of an N-phenyl-N'-(1,3-dimethylbutyl)-p-phenylenediamine was added and a water temperature 60° C. rotary evaporator was used to remove the residual monomers and obtain a latex of a nitrile rubber (solid content concentration about 25 wt %).

Next, to the above obtained latex, an aqueous solution of aluminum sulfate was added in an amount corresponding to 3 wt % of the nitrile rubber content in the above obtained latex and the result was stirred so as to coagulate the latex, then this was washed with water while filtering it, then dried in vacuo at 60° C. for 12 hours to obtain a nitrile rubber. Further, the obtained nitrile rubber was dissolved in acetone to a concentration of 12 wt %. This was placed in an autoclave. A palladium-silica catalyst was added to the nitrile rubber in an amount of 500 ppm by weight and a hydrogenation reaction was performed under a hydrogen pressure of 3.0 MPa to thereby obtain a solution of a nitrile rubber composition (a-9) containing a highly saturated nitrile rubber (A-4) and N-phenyl-N'-(1,3-dimethylbutyl)-p-phenylenediamine.

Further, part of the solution of the obtained nitrile rubber composition (a-9) was taken out, poured into a large amount of water to make it coagulate, filtered, and dried to thereby obtain a solid nitrile rubber composition (a-9). The composition of the highly saturated nitrile rubber (A-4) contained in the obtained nitrile rubber composition (a-9) was 36 wt % of acrylonitrile units and 74 wt % of butadiene units (including saturated part), the iodine value was 13, and the polymer Mooney viscosity ($ML_{1+4}$, 100° C.) was 83. Part of the obtained solid nitrile rubber composition (a-9) was made the "plasticity number Ill measurement-use sample".

Further, in the same way as Production Example 1, separate from the above, the remaining part of the solution of the obtained nitrile rubber composition (a-9) was used to obtain the aqueous dispersion of the nitrile rubber composition (a-9) and this was stored at 70° C. for 7 days. Further, to the aqueous dispersion after storage at 70° C. for 7 days, two volumes of methanol were added to coagulate the same, then the result was filtered and the solids (crumbs) were taken out. These were vacuum dried at 60° C. for 12 hours to thereby obtain a nitrile rubber composition (a-9) after storage at 70° C. for 7 days. Further, part of the obtained nitrile rubber composition (a-9) after storage at 70° C. for 7 days was used to evaluate the capillary extrudability in accordance with the above method, and a separately part of the obtained nitrile rubber composition (a-9) after storage at 70° C. for 7 days was sampled to be made the "plasticity number η2 measurement-use sample". Further, the above obtained "plasticity number η1 measurement-use sample" and "plasticity number η2 measurement-use sample" were used to measure the difference (η2−η1) between the plasticity number η2 and the plasticity number η1 in accordance with the above method.

Production Example 10 (Production of Nitrile Rubber Composition (a-10))

In a reactor, to 200 parts of ion exchanged water, 0.2 part of sodium carbonate was dissolved. To this, 2.25 parts of a fatty acid potassium soap (potassium salt of fatty acid) was added to prepare a soap aqueous solution. Further, to this soap aqueous solution, 38 parts of acrylonitrile and 0.45 part of t-dodecylmercaptan (molecular weight adjuster) were successively charged. The gas at the inside was replaced with nitrogen three times, then 62 parts of 1,3-butadiene was charged. Next, the inside of the reactor was held at 5° C. and 0.1 part of cumen hydroperoxide (polymerization initiator) and suitable quantities of a reducing agent and a chelating agent were charged and the polymerization reaction started. Further, when the polymer conversion rate reached 80%, 0.05 part of a concentration 10% hydroquinone (polymerization terminator) aqueous solution was added to stop the polymerization reaction then 0.1 part of an alkylated phenol compound (B) comprised of 2,2'-methylenebis(4-methyl-6-tert-butylphenol) was added and a water temperature 60° C. rotary evaporator was used to remove the residual monomers and obtain a latex of a nitrile rubber (solid content concentration about 25 wt %).

Next, to the above obtained latex, an aqueous solution of aluminum sulfate was added in an amount corresponding to 3 wt % of the nitrile rubber content in the above obtained latex and the result was stirred so as to coagulate the latex, then this was washed with water while filtering it, then dried in vacuo at 60° C. for 12 hours to obtain a nitrile rubber. Further, the obtained nitrile rubber was dissolved in acetone to a concentration of 12 wt %. This was placed in an autoclave. A palladium-silica catalyst was added to the nitrile rubber in an amount of 500 ppm by weight and a hydrogenation reaction was performed under a hydrogen pressure of 3.0 MPa to thereby obtain a solution of a nitrile rubber composition (a-10) containing a highly saturated nitrile rubber (A-5) and an alkylated phenol compound (B) comprised of 2,2'-methylenebis(4-methyl-6-tert-butylphenol).

Further, part of the solution of the obtained nitrile rubber composition (a-10) was taken out, poured into a large amount of water to make it coagulate, filtered, and dried to thereby obtain a solid nitrile rubber composition (a-10). The composition of the highly saturated nitrile rubber (A-5) contained in the obtained nitrile rubber composition (a-10) was 36 wt % of acrylonitrile units and 74 wt % of butadiene units (including saturated part), the iodine value was 13, and the polymer Mooney viscosity ($ML_{1+4}$, 100° C.) was 83. Part of the obtained solid nitrile rubber composition (a-10) was made the "plasticity number $\eta$1 measurement-use sample".

Further, in the same way as Production Example 1, separate from the above, the remaining part of the solution of the obtained nitrile rubber composition (a-10) was used to obtain the aqueous dispersion of the nitrile rubber composition (a-10) and this was stored at 70° C. for 7 days. Further, to the aqueous dispersion after storage at 70° C. for 7 days, two volumes of methanol were added to coagulate the same, then the result was filtered and the solids (crumbs) were taken out. These were vacuum dried at 60° C. for 12 hours to thereby obtain a nitrile rubber composition (a-10) after storage at 70° C. for 7 days. Further, part of the obtained nitrile rubber composition (a-10) after storage at 70° C. for 7 days was used to evaluate the capillary extrudability in accordance with the above method, and a separately part of the obtained nitrile rubber composition (a-10) after storage at 70° C. for 7 days was sampled to be made the "plasticity number $\eta$2 measurement-use sample". Further, the above obtained "plasticity number $\eta$1 measurement-use sample" and "plasticity number $\eta$2 measurement-use sample" were used to measure the difference ($\eta$2–$\eta$1) between the plasticity number $\eta$2 and the plasticity number $\eta$1 in accordance with the above method.

Production Example 11 (Production of Nitrile Rubber Composition (a-11))

In a reactor, to 200 parts of ion exchanged water, 0.2 part of sodium carbonate was dissolved. To this, 2.25 parts of a fatty acid potassium soap (potassium salt of fatty acid) was added to prepare a soap aqueous solution. Further, to this soap aqueous solution, 13 parts of acrylonitrile, 29 parts of n-butyl acrylate, and 0.45 part of molecular weight adjuster were charged. The gas at the inside was replaced with nitrogen three times, then 21 parts of 1,3-butadiene was charged. Next, the inside of the reactor was held at 5° C. and 0.5 part of cumen hydroperoxide (polymerization initiator), a suitable quantity of a reducing agent, and a chelating agent were charged and the mixture stirred while continuing an 8 hour polymerization reaction. Note that, in the present production example, the amount of the chelating agent charged was made an amount of 50 times the amount charged in the Production Example 1 (1.2 parts converted to metal (by weight of metal)). Next, 0.2 part of a concentration 10 wt % hydroquinone aqueous solution (polymerization terminator) and 0.3 part of N-isopropylhydroxylamine (polymerization terminator) were added to stop the polymerization reaction, then 0.4 part of the alkylated phenol compound (B) comprised of 2,2'-methylenebis(4-methyl-6-tert-butylphenol) was added, then a suitable quantity of the pH adjuster was charged, the pH was made 4, and a water temperature 70° C. rotary evaporator was used to remove the residual monomers to obtain a latex of a nitrile rubber (solid content concentration about 30 wt %).

Next, to the above obtained latex, an aqueous solution of aluminum sulfate was added in an amount corresponding to 3 wt % of the nitrile rubber content in the above obtained latex and the result was stirred so as to coagulate the latex, then this was washed with water while filtering it, then dried in vacuo at 60° C. for 12 hours to obtain a nitrile rubber.

Further, the obtained nitrile rubber was dissolved in acetone to a concentration of 12 wt %. This was placed in an autoclave. A palladium-silica catalyst was added to the nitrile rubber in an amount of 500 ppm by weight and a hydrogenation reaction was performed under a hydrogen pressure of 3.0 MPa to thereby obtain a solution of a nitrile rubber composition (a-11) containing a highly saturated nitrile rubber (A-6) and an alkylated phenol compound (B) comprised of 2,2'-methylenebis(4-methyl-6-tert-butylphenol).

Further, part of the solution of the obtained nitrile rubber composition (a-11) was taken out, poured into a large amount of water to make it coagulate, filtered, and dried to thereby obtain a solid nitrile rubber composition (a-11). The composition of the highly saturated nitrile rubber (A-6) contained in the obtained nitrile rubber composition (a-11) was 26.2 wt % of acrylonitrile units, 29.3 wt % of n-butyl acrylate units, and 44.5 wt % of butadiene units (including saturated part), the iodine value was 15, and the polymer Mooney viscosity ($ML_{1+4}$, 100° C.) was 70. Part of the obtained solid nitrile rubber composition (a-11) was designated as the "plasticity number $\eta$1 measurement-use sample"

Further, in the same way as Production Example 1, separate from the above, the remaining part of the solution of the obtained nitrile rubber composition (a-11) was used to obtain the aqueous dispersion of the nitrile rubber composition (a-11) and this was stored at 70° C. for 7 days. Further, to the aqueous dispersion after storage at 70° C. for 7 days, two volumes of methanol were added to coagulate the same, then the result was filtered and the solids (crumbs) were taken out. These were vacuum dried at 60° C. for 12 hours to thereby obtain a nitrile rubber composition (a-11) after storage at 70° C. for 7 days. Further, part of the obtained nitrile rubber composition (a-11) after storage at 70° C. for 7 days was used to evaluate the capillary extrudability in accordance with the above method, and a separately part of the obtained nitrile rubber composition (a-11) after storage at 70° C. for 7 days was sampled to be made the "plasticity number $\eta$2 measurement-use sample". Further, the above obtained "plasticity number $\eta$1 measurement-use sample" and "plasticity number $\eta$2 measurement-use sample" were used to measure the difference ($\eta$2–$\eta$1) between the plasticity number $\eta$2 and the plasticity number $\eta$1 in accordance with the above method.

Production Example 12 (Production of Nitrile Rubber Composition (a-12))

Except for changing the amount of addition of the alkylated phenol compound (B) comprised of 2,2'-methylenebis (4-methyl-6-tert-butylphenol) after stopping the polymerization reaction from 0.13 part to 3.0 parts, the same procedure was performed as in Production Example 4 to obtain a solution of a nitrile rubber composition (a-12) containing the highly saturated nitrile rubber (A-1) and alkylated phenol compound (B) comprised of 2,2'-methylenebis(4-methyl-6-tert-butylphenol) and the same procedure was performed to store it at 70° C. for 7 days and measure it.

Table 1 shows together the nitrile rubber compositions obtained in the production examples.

TABLE 1

| | | Production Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Type of nitrile rubber composition | | (a-1) | (a-2) | (a-3) | (a-4) | (a-5) | (a-6) | (a-7) | (a-8) | (a-9) | (a-10) | (a-11) | (a-12) |
| Type of highly saturated nitrile rubber | | (A-1) | (A-2) | (A-3) | (A-1) | (A-3) | (A-3) | (A-1) | (A-2) | (A-4) | (A-5) | (A-6) | (A-1) |
| Composition of highly saturated nitrile rubber | | | | | | | | | | | | | |
| Acrylonitrile units | (wt %) | 36 | 26.2 | 35.6 | 36 | 35.6 | 35.6 | 36 | 26.2 | 36 | 36 | 26.2 | 36 |
| Butadiene units (including saturated parts) | (wt %) | 74 | 44.5 | 59 | 74 | 59 | 59 | 74 | 44.5 | 74 | 74 | 44.5 | 74 |
| n-butyl acrylate units | (wt %) | | 29.3 | | | | | | 29.3 | | | 29.3 | |
| Mono-n-butyl maleate units | (wt %) | | | 5.4 | | 5.4 | 5.4 | | | | | | |
| Content of 2,6-di-tert-butyl-4-methylphenol* | (wt %) | 0.25 | 0.39 | | | | | | | | | | |
| Content of 2,2'-methylenebis(4-methyl-6-tert-butylphenol)* | (wt %) | | | 0.09 | 0.04 | 0.34 | | | | | 0.04 | 0.1 | 2.7 |
| Content of N-phenyl-N'-(1,3-dimethylbutyl)-p-phenylenediamine* | (wt %) | | | | | | | | | 0.08 | | | |
| Difference of plasticity numbers ($\eta 2 - \eta 1$) | | 2 | 8 | 9 | 10 | 3 | 15 | 18 | 20 | 5 | 14 | 16 | 6 |
| Capillary extrudability (amount of extrusion after 60 seconds) | (mm³) | 3012 | 2830 | 2603 | 2068 | 2543 | 1963 | 1532 | 1433 | 2740 | 1821 | 2406 | 2056 |

*)Amount with respect to total 100 wt % of highly saturated nitrile rubber and the same

Example 1

Using a Bambury mixer, 100 parts of the nitrile rubber composition (a-1) obtained in Production Example 1 and 10 parts of co-poly-p-phenylene-3,4'-oxydiphenylene terephthalamide staple fiber (product name "Technora ZCF T323SB 1 mm", made by Teijin Technoproducts, aramid staple fiber having average fiber length 1 mm and average fiber diameter 12 µm) were kneaded. Next, the mixture was transferred to rolls and 8 parts of 1,3-bis(t-butylperoxyisopropyl)benzene 40% product (product name "Vul Cup 40KE", made by Arkema, organic peroxide cross-linking agent) were added and kneaded in to thereby obtain a cross-linkable nitrile rubber composition. Note that, in the present example, as the nitrile rubber composition (a-1), a composition obtained by storage in the state of an aqueous dispersion at 70° C. for 7 days, then coagulation was used (same for later explained Examples 2 to 5 and Comparative Examples 1 to 8).

Further, the obtained cross-linkable nitrile rubber composition was used in accordance with the above-mentioned method to perform a 20% tensile stress test. The result is shown in Table 2.

Example 2

Except for using, instead of the nitrile rubber composition (a-1) obtained in the Production Example 1, the nitrile rubber composition (a-2) obtained in Production Example 2, the same procedure was followed as in Example 1 to obtain a cross-linkable nitrile rubber composition and the same procedure was followed to evaluate it. The result is shown in Table 2.

Example 3

Using a Bambury mixer, 100 parts of the nitrile rubber composition (a-3) obtained in Production Example 3 and 10 parts of co-poly-p-phenylene-3,4'-oxydiphenylene terephthalamide staple fiber (product name "Technora ZCF T323SB 1 mm", made by Teijin Technoproducts, aramid staple fiber having average fiber length 1 mm and average fiber diameter 12 µm) were kneaded. Next, the mixture was transferred to rolls and 6.3 parts of 2,2-bis[4-(4-aminophenoxy)phenyl]propane (polyamine cross-linking agent) and 4 parts of 1,8-diazabicyclo[5,4,0]undecene-7 (DBU) (product name "RHENOGRAN XLA-60 (GE2014)", made by RheinChemie, DBU60% (including also part forming zinc dialkyldiphosphate salt), basic cross-linking accelerator) were added and kneaded in to obtain a cross-linkable nitrile rubber composition.

Further, the obtained cross-linkable nitrile rubber composition was used to perform a 20% tensile stress test in accordance with the above-mentioned method. The result is shown in Table 2.

Example 4

Except for using, instead of the nitrile rubber composition (a-1) obtained in Production Example 1, the nitrile rubber composition (a-4) obtained in Production Example 4, the same procedure was followed as in Example 1 to obtain a cross-linkable nitrile rubber composition and the same procedure was followed to evaluate it. The result is shown in Table 2.

Example 5

Except for using, instead of the nitrile rubber composition (a-3) obtained in Production Example 3, the nitrile rubber composition (a-5) obtained in Production Example 5, the same procedure was followed as in Example 3 to obtain a cross-linkable nitrile rubber composition and the same procedure was followed to evaluate it. The result is shown in Table 2.

Comparative Example 1

Except for using, instead of the nitrile rubber composition (a-3) obtained in Production Example 3, the nitrile rubber composition (a-6) obtained in Production Example 6, the same procedure was followed as in Example 3 to obtain a cross-linkable nitrile rubber composition and the same procedure was followed to evaluate it. The result is shown in Table 2.

Comparative Example 2

Except for using, instead of the nitrile rubber composition (a-1) obtained in Production Example 1, the nitrile rubber composition (a-7) obtained in Production Example 7 and not adding 10 parts of co-poly-p-phenylene-3,4'-oxydiphenylene terephthalamide staple fiber, the same procedure was followed as in Example 1 to obtain a cross-linkable nitrile rubber composition and the same procedure was followed to evaluate it. The result is shown in Table 2.

Comparative Example 3

Except for using, instead of the nitrile rubber composition (a-1) obtained in Production Example 1, the nitrile rubber composition (a-7) obtained in Production Example 7, the same procedure was followed as in Example 1 to obtain a cross-linkable nitrile rubber composition and the same procedure was followed to evaluate it. The result is shown in Table 2.

Comparative Example 4

Except for using, instead of the nitrile rubber composition (a-7) obtained in Production Example 7, the nitrile rubber composition (a-8) obtained in Production Example 8, the same procedure was followed as in Comparative Example 2 to obtain a cross-linkable nitrile rubber composition and the same procedure was followed to evaluate it. The result is shown in Table 2.

Comparative Example 5

Except for using, instead of the nitrile rubber composition (a-1) obtained in Production Example 1, the nitrile rubber composition (a-9) obtained in Production Example 9, the same procedure was followed as in Example 1 to obtain a cross-linkable nitrile rubber composition and the same procedure was followed to evaluate it. The result is shown in Table 2.

Comparative Example 6

Except for using, instead of the nitrile rubber composition (a-1) obtained in Production Example 1, the nitrile rubber composition (a-10) obtained in Production Example 10, the same procedure was followed as in Example 1 to obtain a cross-linkable nitrile rubber composition and the same procedure was followed to evaluate it. The result is shown in Table 2.

Comparative Example 7

Except for using, instead of the nitrile rubber composition (a-1) obtained in Production Example 1, the nitrile rubber composition (a-11) obtained in Production Example 11, the same procedure was followed as in Example 1 to obtain a cross-linkable nitrile rubber composition and the same procedure was followed to evaluate it. The result is shown in Table 2.

Comparative Example 8

Except for using, instead of the nitrile rubber composition (a-1) obtained in Production Example 1, the nitrile rubber composition (a-12) obtained in Production Example 12, the same procedure was followed as in Example 1 to obtain a cross-linkable nitrile rubber composition and the same procedure was followed to evaluate it. The result is shown in Table 2.

TABLE 2

| | | Examples | | | | | Comparative Examples | |
|---|---|---|---|---|---|---|---|---|
| | | 1 | 2 | 3 | 4 | 5 | 1 | 2 |
| Type of nitrile rubber composition | | (a-1) | (a-2) | (a-3) | (a-4) | (a-5) | (a-6) | (a-7) |
| Type of highly saturated nitrile rubber | | (A-1) | (A-2) | (A-3) | (A-1) | (A-3) | (A-3) | (A-1) |
| Composition of cross-linkable nitrile rubber composition | | | | | | | | |
| Nitrile rubber composition | (parts) | 100 | 100 | 100 | 100 | 100 | 100 | 100 |
| Aramid staple fiber | (parts) | 10 | 10 | 10 | 10 | 10 | 10 | |
| Organic peroxide cross-linking agent | (parts) | 8 | 8 | | 8 | | | 8 |
| Polyamine cross-linking agent | (parts) | | | 6.3 | | 6.3 | 6.3 | |
| Basic cross-linking accelerator | (parts) | | | 4 | | 4 | 4 | |
| Content of 2,6-di-tert-butyl-4-methylphenol* | (wt %) | 0.25 | 0.39 | | | | | |
| Content of 2,2'-methylenebis(4-methyl-6-tert-butylphenol)* | (wt %) | | | 0.09 | 0.04 | 0.34 | | |
| Content of N-phenyl-N'-(1,3-dimethylbutyl)-p-phenylenediamine*) | (wt %) | | | | | | | |
| Difference of plasticity numbers (η 2 − η 1) | | 2 | 8 | 9 | 10 | 3 | 15 | 18 |
| Capillary extrudability (amount of extrusion after 60 seconds) | (mm³) | 3012 | 2830 | 2603 | 2068 | 2543 | 1963 | 1532 |
| 20% tensile stress of cross-linked rubber | (MPa) | 10.8 | 10.7 | 13.2 | 9.9 | 15.8 | 7.49 | 0.99 |

| | | Comparative Examples | | | | | |
|---|---|---|---|---|---|---|---|
| | | 3 | 4 | 5 | 6 | 7 | 8 |
| Type of nitrile rubber composition | | (a-7) | (a-8) | (a-9) | (a-10) | (a-11) | (a-12) |
| Type of highly saturated nitrile rubber | | (A-1) | (A-2) | (A-4) | (A-5) | (A-6) | (A-1) |

TABLE 2-continued

Table 2

| Composition of cross-linkable nitrile rubber composition | | | | | | | |
|---|---|---|---|---|---|---|---|
| Nitrile rubber composition | (parts) | 100 | 100 | 100 | 100 | 100 | 100 |
| Aramid staple fiber | (parts) | 10 | | 10 | 10 | 10 | 10 |
| Organic peroxide cross-linking agent | (parts) | 8 | 8 | 8 | 8 | 8 | 8 |
| Polyamine cross-linking agent | (parts) | | | | | | |
| Basic cross-linking accelerator | (parts) | | | | | | |
| Content of 2,6-di-tert-butyl-4-methylphenol* | (wt %) | | | | | | |
| Content of 2,2'-methylenebis(4-methyl-6-tert-butylphenol)* | (wt %) | | | | 0.04 | 0.1 | 2.7 |
| Content of N-phenyl-N'-(1,3-dimethylbutyl)-p-phenylenediamine* | (wt %) | | | 0.08 | | | |
| Difference of plasticity numbers ($\eta 2 - \eta 1$) | | 18 | 20 | 5 | 14 | 16 | 6 |
| Capillary extrudability (amount of extrusion after 60 seconds) | (mm³) | 1532 | 1433 | 2740 | 1821 | 2406 | 2056 |
| 20% tensile stress of cross-linked rubber | (MPa) | 5.79 | 1.02 | 6.98 | 6.32 | 7.23 | 5.8 |

*)Amount with respect to total 100 wt % of highly saturated nitrile rubber and the same From Tables 1 and 2, a nitrile rubber composition containing the highly saturated nitrile rubber (A) and a predetermined amount of alkylated phenol compound (B) and having a difference ($\eta 2-\eta 1$) between a plasticity number $\eta 2$ after storage at 70° C. for 7 days and a plasticity number $\eta 1$ before the storage of 12 or less had a large amount of extrusion in the evaluation of the capillary extrudability and was excellent in processability (fluidity) and, furthermore, the obtained cross-linked rubber was excellent in 20% tensile stress (Production Examples 1 to 5 and Examples 1 to 5). Note that, in the examples, the capillary extrudability and 20% tensile stress were evaluated using samples stored in a state of an aqueous dispersion at 70° C. for 7 days, then coagulated, this was in consideration of the fact that in the field of rubber compositions such as the nitrile rubber composition of the present invention, most of the time, the compositions are used after being stored for a relatively long time after manufacture (for example, at ordinary temperature for 1440 hours or more).

On the other hand, when not mixing in an alkylated phenol compound (B), the obtained nitrile rubber composition became small in amount of extrusion in evaluation of the capillary extrudability and inferior in processability (fluidity). Furthermore, the obtained cross-linked rubber became inferior in 20% tensile stress (Production Example 6 to 8 and Comparative Examples 1 to 4).

When using N-phenyl-N'-(1,3-dimethylbutyl)-p-phenylenediamine instead of the alkylated phenol compound (B), the result was inferior in 20% tensile stress when made into a cross-linked rubber (Production Example 9 and Comparative Example 5).

Further, even when mixing in an alkylated phenol compound (B), when a difference ($\eta 2-\eta 1$) between a plasticity number $\eta 2$ after storage at 70° C. for 7 days and a plasticity number $\eta 1$ before the storage is over 12, the result became small in amount of extrusion in evaluation of the capillary extrudability and inferior in processability (fluidity) or the result became inferior in 20% tensile stress when made into a cross-linked rubber (Production Examples 10 and 11 and Comparative Examples 6 and 7).

Furthermore, when the content of the alkylated phenol compound (B) was too great, the result became inferior in 20% tensile stress when made into a cross-linked rubber (Production Example 12 and Comparative Example 8).

The invention claimed is:

1. A nitrile rubber composition comprising:
   a highly saturated nitrile rubber (A) containing α,β-ethylenically unsaturated nitrile monomer units in a ratio of 8 to 60 wt % and having an iodine value of 120 or less;
   an alkylated phenol compound (B); and
   an organic staple fiber,
   wherein:
   a ratio of content of the alkylated phenol compound (B) with respect to a total of the highly saturated nitrile rubber (A) and the alkylated phenol compound (B) is 0.01 to 1 wt %, and
   a difference ($\eta 2-\eta 1$) between a plasticity number $\eta 2$ after storage at 70° C. for 7 days in a state of an aqueous dispersion by being dispersed in water and a plasticity number $\eta 1$ before the storage is 12 or less.

2. The nitrile rubber composition according to claim 1, wherein the ratio of content of the alkylated phenol compound (B) with respect to a total of the highly saturated nitrile rubber (A) and the alkylated phenol compound (B) is 0.01 to 0.95 wt %.

3. The nitrile rubber composition according to claim 1, wherein the alkylated phenol compound (B) is a compound represented by the following general formula (1) or a compound represented by the following general formula (2):

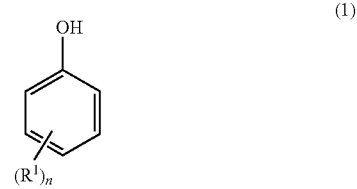

(1)

where, in the general formula (1), each of $R^1$ is respectively independently an alkyl group having 1 to 7 carbon atoms, alkoxy group having 1 to 5 carbon atoms, amino group, amino group substituted by an alkyl group having 1 to 4 carbon atoms, or nitrogen-containing heterocyclic group, and "n" is an integer of 1 to 5; in the above general formula (1), at least one of $R^1$ is an alkyl group having 1 to 7 carbon atoms:

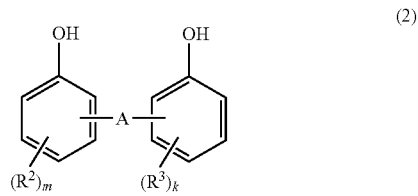

(2)

where, in the general formula (2), each of $R^2$ and $R^3$ is respectively independently an alkyl group having 1 to 7 carbon atoms, an alkoxy group having 1 to 5 carbon atoms, amino group, amino group substituted by an alkyl group having 1 to 4 carbon atoms, or nitrogen-containing heterocyclic group, A is a chemical single bond or alkylene group having 1 to 4 carbon atoms, and each of "m" and "k" is respectively independently an integer of 1 to 4; in the above general formula (2), at least one of $R^2$ is an alkyl group having 1 to 7 carbon atoms, while in the above general formula (2), at least one of $R^3$ is an alkyl group having 1 to 7 carbon atoms.

4. A latex composition of a highly saturated nitrile rubber comprising:
  a highly saturated nitrile rubber (A) containing α,β-ethylenically unsaturated nitrile monomer units in a ratio of 8 to 60 wt % and having an iodine value of 120 or less;
  an alkylated phenol compound (B); and
  an organic staple fiber,
  wherein:
  a ratio of content of the alkylated phenol compound (B) with respect to a total of the highly saturated nitrile rubber (A) and the alkylated phenol compound (B) is 0.01 to 1 wt %, and
  a difference (η2−η1) between a plasticity number η2 of a coagulated product after storage at 70° C. for 7 days and a plasticity number η1 of a coagulated product before the storage is 12 or less.

5. The latex composition of a highly saturated nitrile rubber according to claim 4, wherein the ratio of content of the alkylated phenol compound (B) with respect to a total of the highly saturated nitrile rubber (A) and the alkylated phenol compound (B) is 0.01 to 0.95 wt %.

6. The latex composition of a highly saturated nitrile rubber according to claim 4, wherein the alkylated phenol compound (B) is a compound represented by the following general formula (1) or a compound represented by the following general formula (2):

(1)

where, in the general formula (1), each of $R^1$ is respectively independently an alkyl group having 1 to 7 carbon atoms, alkoxy group having 1 to 5 carbon atoms, amino group, amino group substituted by an alkyl group having 1 to 4 carbon atoms, or nitrogen-containing heterocyclic group, and "n" is an integer of 1 to 5; in the above general formula (1), at least one of $R^1$ is an alkyl group having 1 to 7 carbon atoms:

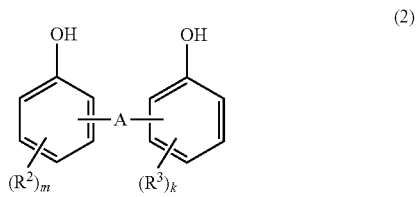

(2)

where, in the general formula (2), each of $R^2$ and $R^3$ is respectively independently an alkyl group having 1 to 7 carbon atoms, an alkoxy group having 1 to 5 carbon atoms, amino group, amino group substituted by an alkyl group having 1 to 4 carbon atoms, or nitrogen-containing heterocyclic group, A is a chemical single bond or alkylene group having 1 to 4 carbon atoms, and each of "m" and "k" is respectively independently an integer of 1 to 4; in the above general formula (2), at least one of $R^2$ is an alkyl group having 1 to 7 carbon atoms, while in the above general formula (2), at least one of $R^3$ is an alkyl group having 1 to 7 carbon atoms.

7. A cross-linkable nitrile rubber composition obtained by mixing a cross-linking agent into the nitrile rubber composition according to claim 1.

8. A cross-linked rubber obtained by cross-linking a cross-linkable nitrile rubber composition according to claim 7.

9. A cross-linkable nitrile rubber composition obtained by mixing a cross-linking agent into a nitrile rubber composition obtained by coagulating the latex composition of a highly saturated nitrile rubber according to claim 4.

10. A cross-linked rubber obtained by cross-linking a cross-linkable nitrile rubber composition according to claim 9.

11. The nitrile rubber composition according to claim 1, wherein the alkylated phenol compound (B) is 2,6-di-tert-butyl-4-methylphenol or 2,2'-methylenebis(4-methyl-6-tert-butylphenol).

12. The latex composition of a highly saturated nitrile rubber according to claim 4, wherein the alkylated phenol compound (B) is 2,6-di-tert-butyl-4-methylphenol or 2,2'-methylenebis(4-methyl-6-tert-butylphenol).

* * * * *